(12) United States Patent
Oz et al.

(10) Patent No.: US 12,328,531 B2
(45) Date of Patent: Jun. 10, 2025

(54) METHOD FOR CREATING A VARIABLE MODEL OF A FACE OF A PERSON

(71) Applicant: TRUE MEETING INC., Los Altos, CA (US)

(72) Inventors: Ran Oz, Maccabim (IL); Amir Bassan-Eskenazi, Los Altos, CA (US); Yuval Gronau, Ramat Hasharon (IL); Michael Rabinovich, Tel Aviv (IL); Osnat Goren-Peyser, Tel Aviv (IL); Tal Perl, Los Altos, CA (US); Erez Posner, Rehovot (IL)

(73) Assignee: Cavendish Capital LLC, Wilmington, DE (US)

( * ) Notice: Subject to any disclaimer, the term of this patent is extended or adjusted under 35 U.S.C. 154(b) by 379 days.

(21) Appl. No.: 18/056,254

(22) Filed: Nov. 16, 2022

(65) Prior Publication Data
US 2023/0106330 A1    Apr. 6, 2023

Related U.S. Application Data

(63) Continuation-in-part of application No. 17/539,036, filed on Nov. 30, 2021, now abandoned, which is a
(Continued)

(51) Int. Cl.
*H04N 7/15* (2006.01)
*G06F 3/01* (2006.01)
(Continued)

(52) U.S. Cl.
CPC ............ *H04N 7/157* (2013.01); *G06F 3/013* (2013.01); *G06N 3/04* (2013.01); *G06N 3/045* (2023.01);
(Continued)

(58) Field of Classification Search
CPC ........ H04N 7/157; H04N 7/144; H04N 7/147; H04N 7/152; G06F 3/013; G06N 3/04; G06N 3/045; G06N 3/0464; G06N 3/0475; G06N 3/094; G06T 7/11; G06T 7/70; G06T 15/04; G06T 15/20; G06T 15/205; G06T 17/20; G06T 19/20; G06T 19/00; G06T 2200/08; G06T 2207/30201; G06T 2219/2004; H04L 65/612; H04L 51/10; H04L 65/1089; H04L 65/1093;
(Continued)

(56) References Cited

U.S. PATENT DOCUMENTS

| 10,341,633 B2 * | 7/2019 | Lindner ................... G06T 5/50 |
| 2012/0039515 A1 * | 2/2012 | Jeong ................... G06V 40/173 |
| | | 382/118 |
| 2022/0012953 A1 * | 1/2022 | Powers ................... G06T 7/344 |

* cited by examiner

*Primary Examiner* — Phung-Hoang J Nguyen
(74) *Attorney, Agent, or Firm* — Blank Rome LLP

(57) ABSTRACT

A method for creating a variable model of a face of a person, the method comprises: obtaining a non-riggable model of the face of the person; performing a first approximation process that comprises generating an intermediate variable model that approximates the non-riggable model, using an interactive variable model infrastructure; wherein the generating comprises iteratively changing shape parameters of the intermediate model until fulfilling a proximity condition; and performing a second approximation process that comprises generating the variable model, by iteratively modifying vertices.

10 Claims, 24 Drawing Sheets

Related U.S. Application Data continuation of application No. 17/249,468, filed on Mar. 2, 2021, now Pat. No. 11,792,367, application No. 18/056,254 is a continuation-in-part of application No. 17/304,378, filed on Jun. 20, 2021, now Pat. No. 11,805,157, which is a continuation of application No. 17/249,468, filed on Mar. 2, 2021, now Pat. No. 11,792,367, application No. 18/056,254 is a continuation-in-part of application No. 17/249,468, filed on Mar. 2, 2021, now Pat. No. 11,792,367.

(60) Provisional application No. 63/201,713, filed on May 10, 2021, provisional application No. 63/199,014, filed on Dec. 1, 2020, provisional application No. 63/081,860, filed on Sep. 22, 2020, provisional application No. 63/023,836, filed on May 12, 2020.

(51) Int. Cl.
*G06N 3/04* (2023.01)
*G06N 3/045* (2023.01)
*G06T 7/11* (2017.01)
*G06T 7/70* (2017.01)
*G06T 15/04* (2011.01)
*G06T 15/20* (2011.01)
*G06T 17/20* (2006.01)
*G06T 19/00* (2011.01)
*G06T 19/20* (2011.01)
*H04N 7/14* (2006.01)

(52) U.S. Cl.
CPC ............... *G06T 7/11* (2017.01); *G06T 7/70* (2017.01); *G06T 15/04* (2013.01); *G06T 15/20* (2013.01); *G06T 15/205* (2013.01); *G06T 17/20* (2013.01); *G06T 19/20* (2013.01); *H04N 7/144* (2013.01); *H04N 7/147* (2013.01); *H04N 7/152* (2013.01); *G06T 19/00* (2013.01); *G06T 2200/08* (2013.01); *G06T 2207/30201* (2013.01); *G06T 2219/2004* (2013.01)

(58) Field of Classification Search
CPC . H04L 65/4015; H04L 65/4038; H04L 65/75; H04L 65/80; H04L 12/1822
See application file for complete search history.

Receiving direction of gaze information regarding a direction of gaze of each participant within a representation of a virtual 3D video conference environment that may be associated with the participant. 210

Determining, for each participant, updated 3D participant representation information within the virtual 3D video conference environment, that reflects the direction of gaze of the participant. 220

Generating, for at least one participant, an updated representation of virtual 3D video conference environment, the updated representation of virtual 3D video conference environment represents the updated 3D participant representation information for at least some of the multiple participants. 230

Displaying, by a device of a participant of the multiple participants, an updated representation of the virtual 3D video conference environment, the updated representation may be associated with the participant. 240

Transmitting the updated representation of virtual 3D video conference environment to at least one device of at least one participant. 250

One or more additional steps. 290

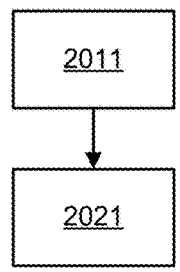
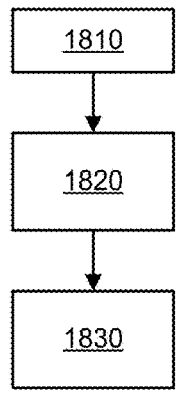
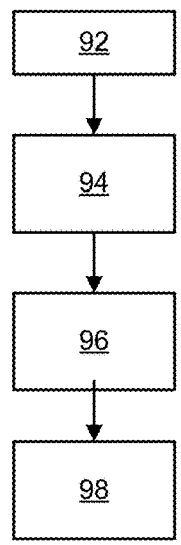
FIG. 6

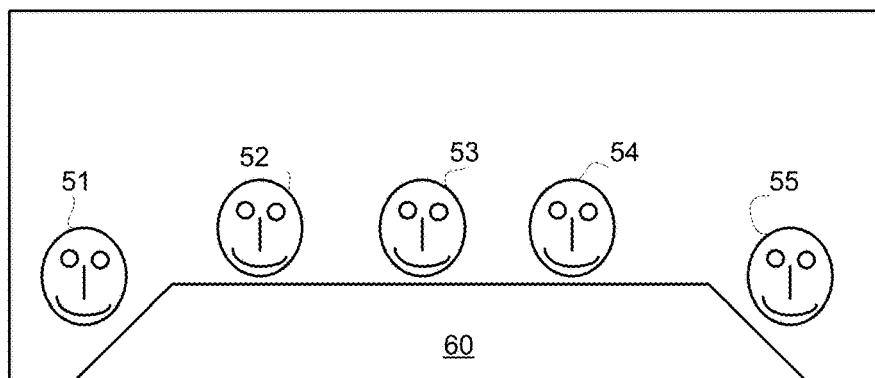
PANORAMIC VIEW 41
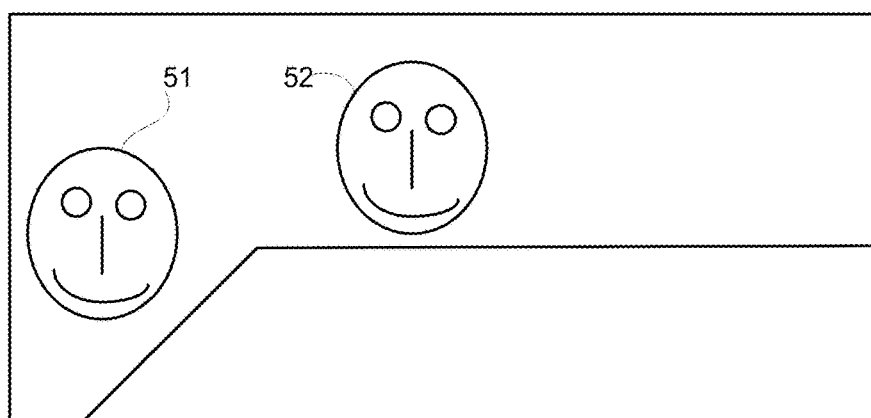
PARTIAL VIEW 42
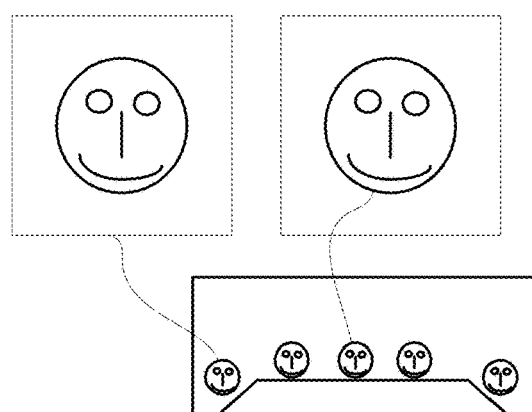
Hybrid view 43
FIG. 7

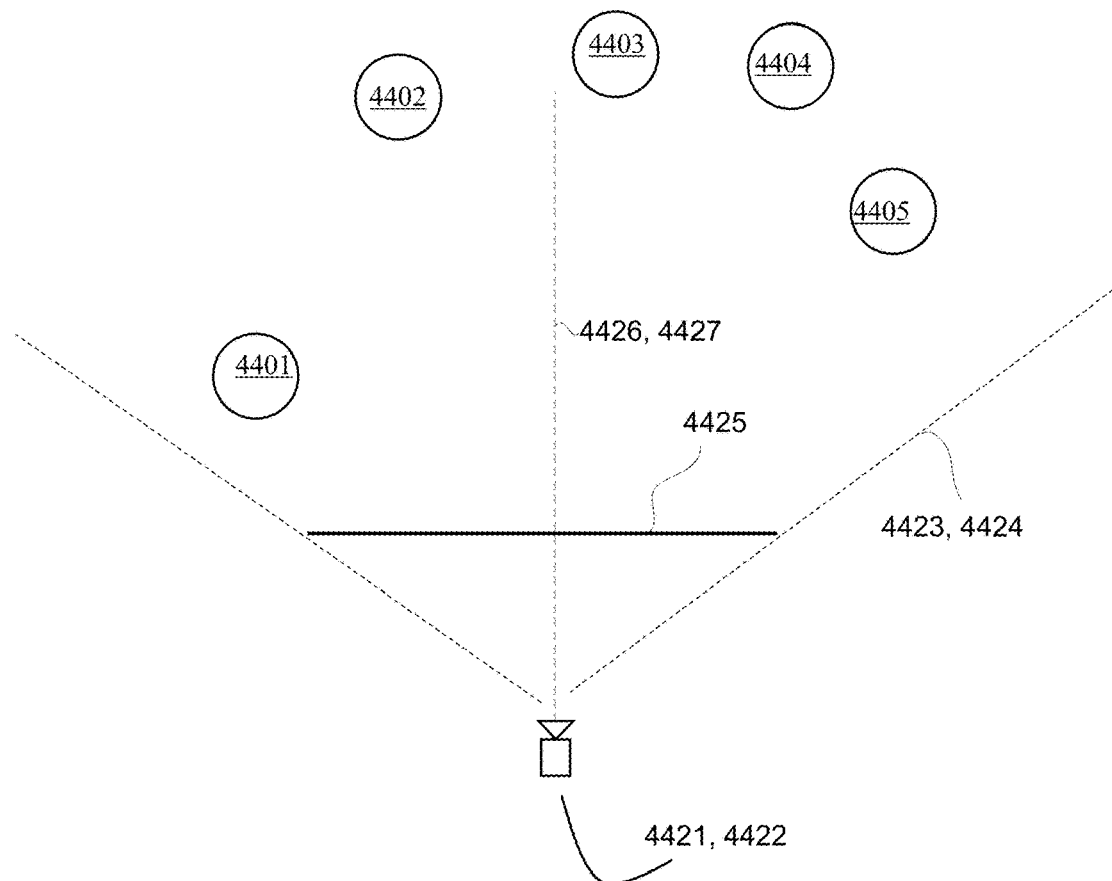
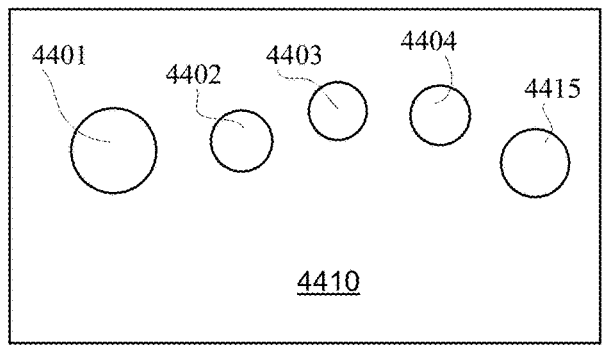
FIG. 8

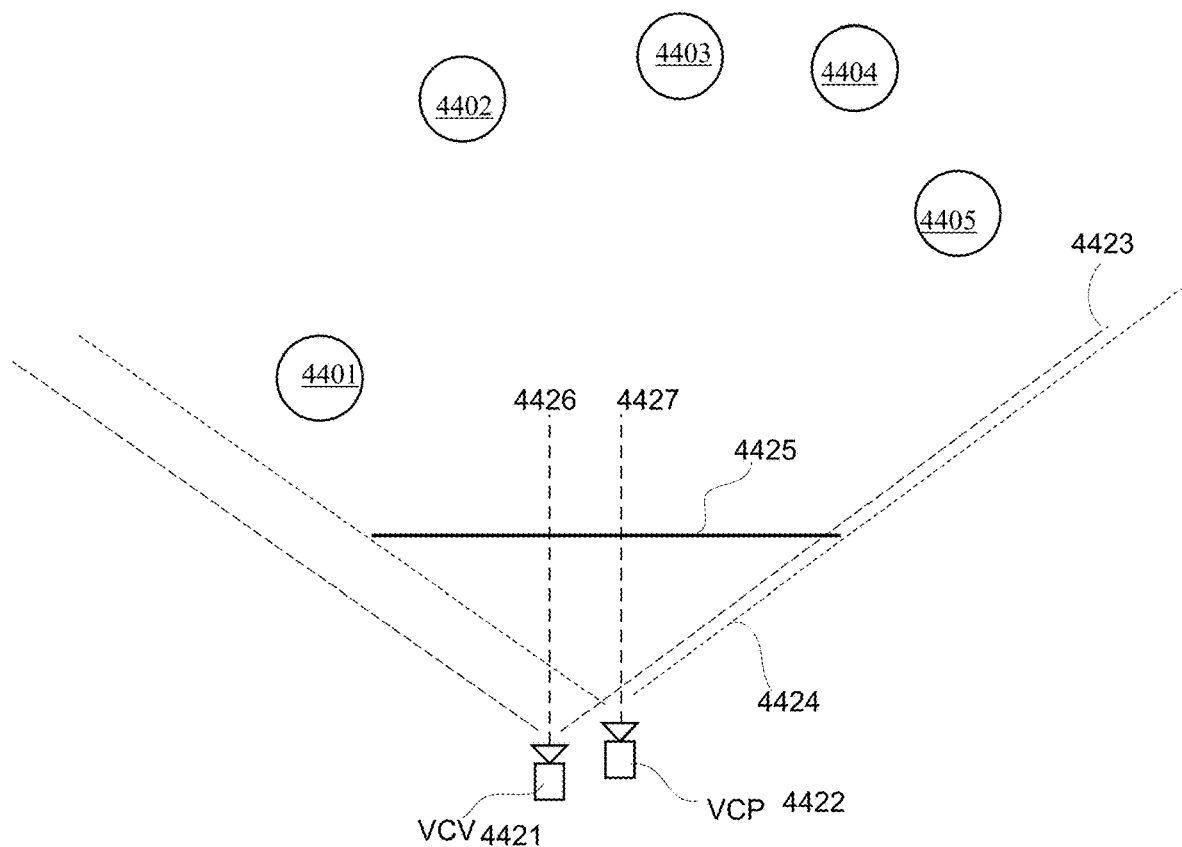
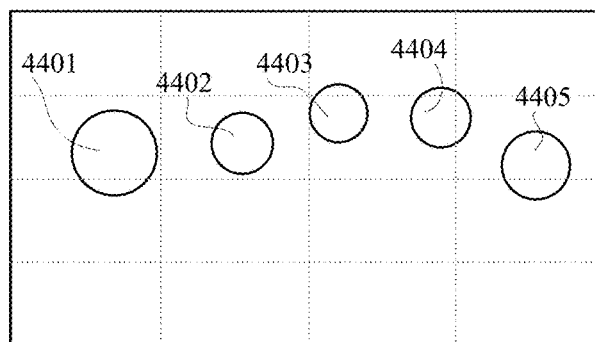
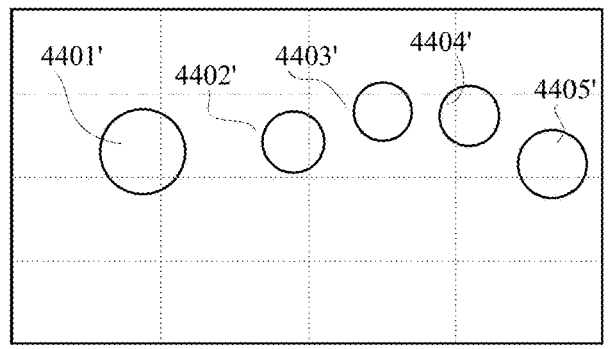
FIG. 9

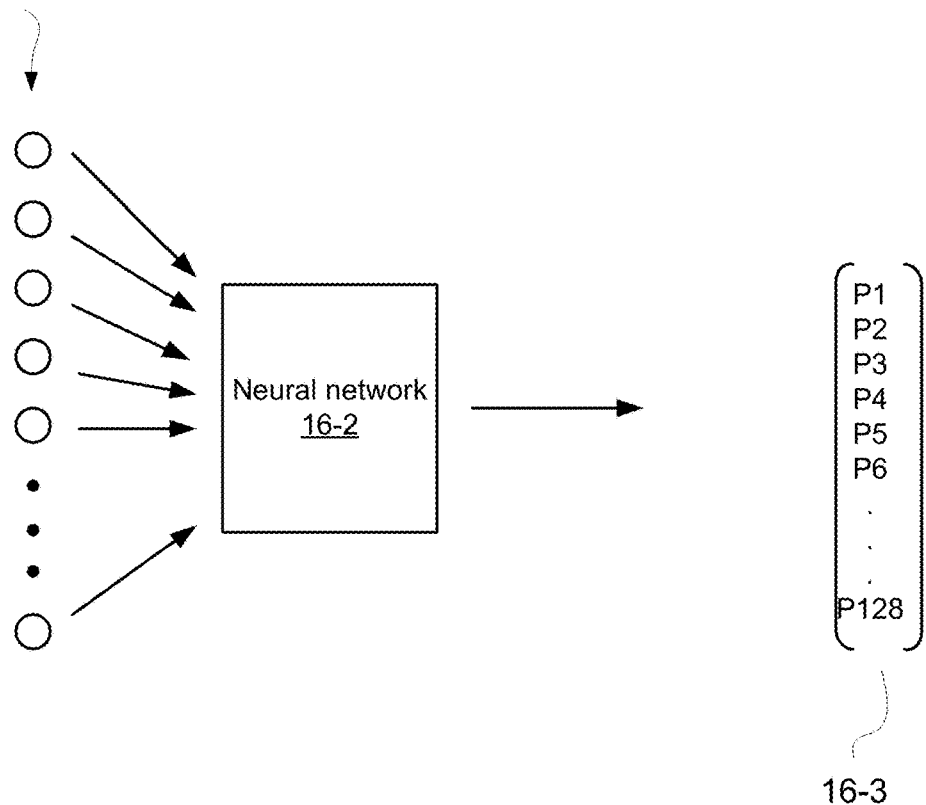
Texture map 16-5 = Sum of (weight vector 16-3)* (base texture maps 16-4-1 till 16-4-J)
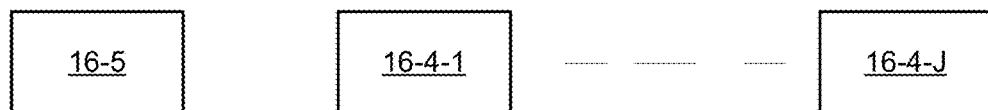
FIG. 15B Finding translation and rotation matrices of all positioned relative to any other position using a 3D point cloud. 460

Creating a 3D mesh. The 3D mesh is not riggable as it has inaccuracies due to the fact that some vertices may have been defined when the face had different expressions or other reasons. 470

400

METHOD FOR CREATING A VARIABLE MODEL OF A FACE OF A PERSON

CROSS REFERENCE

This application is a continuation in part of U.S. patent application Ser. No. 17/249,468 filing date Mar. 2, 2021, which claims priority from U.S. provisional patent Ser. No. 63/023,836 filing date May 12, 2020, from U.S. provisional patent Ser. No. 63/081,860 filing date Sep. 22, 2020, and from U.S. provisional patent Ser. No. 63/199,014 filing date Dec. 1, 2020, all being incorporated herein in their entirety.

This application is a continuation in part of U.S. patent application Ser. No. 17/304,378 filing date Jun. 20, 2021, and from U.S. patent application Ser. No. 17/539,036 filing date Nov. 30, 2021, all being incorporated herein in their entirety.

BACKGROUND

Video conference calls are very popular. They require that each participant has their own computerized system with a camera that is usually located close to a display.

Participants may appear in a virtual space and may be represented by an avatar.

There is a growing need to provide an effective method for generating avatars.

SUMMARY

There may be provided a system, method and computer readable medium for generating an alpha channel.

BRIEF DESCRIPTION OF THE DRAWINGS

FIG. 1 illustrates an example of a method;
FIG. 6 includes examples of methods;
FIG. 7 is an example of a panoramic view of a virtual 3D environment populated by five participants, a partial view of the some of the participants within the virtual 3D environment, and a hybrid view;
FIG. 8 illustrates two camera, fields of views of the two cameras, avatars and a displayed virtual 3D video conference environment (V3DVCE);
FIG. 9 illustrates two camera, fields of views of the two cameras, avatars and a displayed V3DVCE;
FIG. 15B illustrates an example of weights generation.

DESCRIPTION OF THE DRAWINGS

Figure 2:
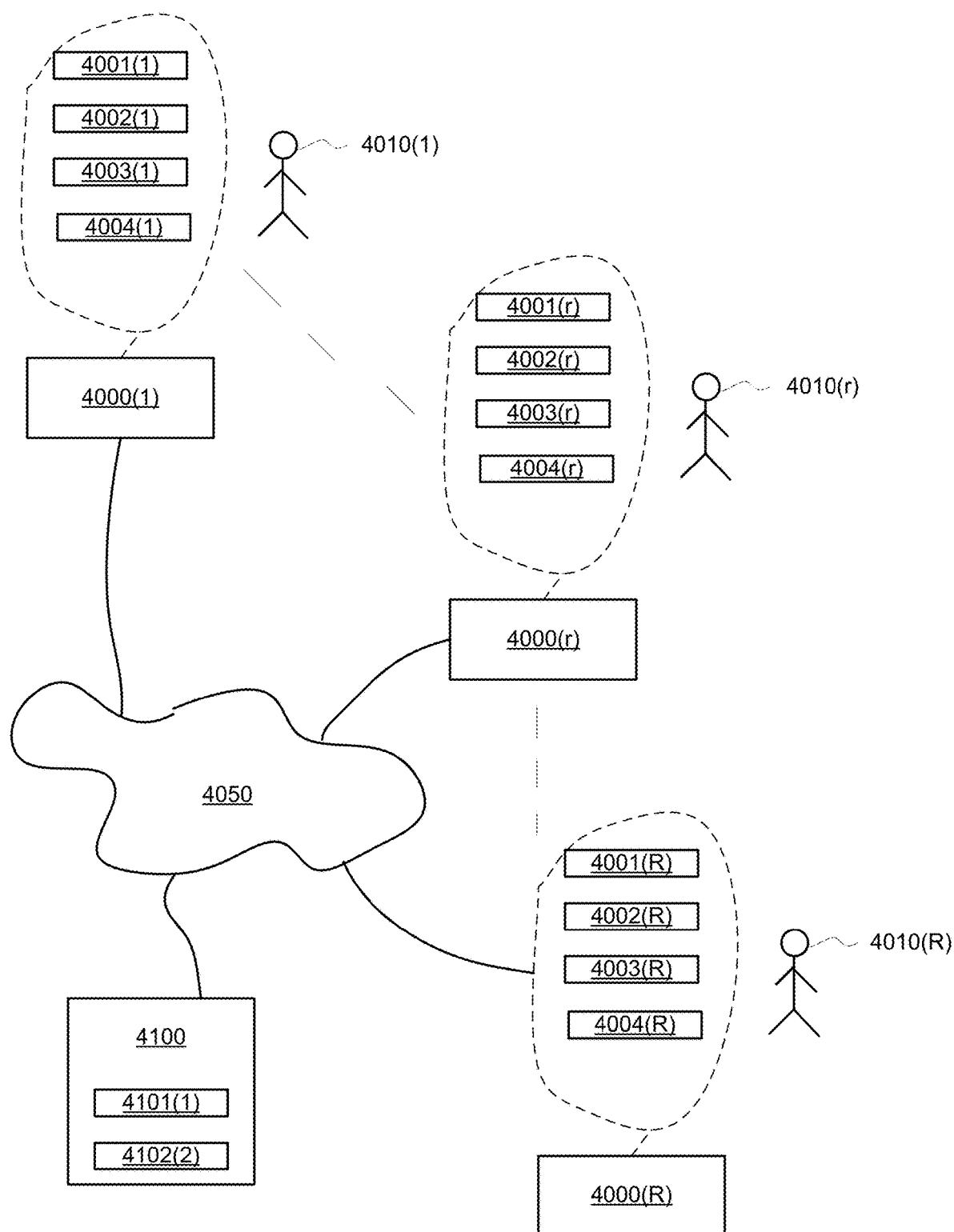
FIG. 2 illustrates an example of a computerized environment.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

The term "and/or" means additionally or alternatively.

Any reference to a "user" should be applied mutatis mutandis to the term "participant"—and vice versa.

There is provided a method, a non-transitory computer readable medium and a system related to video and may, for example be applicable to 3D video conference calls. At least some of the examples and/or embodiments illustrated in the applications may be applied mutatis mutandis for other purposes and/or during other applications.

For example, referring to a 3D video conference that involves multiple participants. A first participant is imaged, and a second participant wishes to view a first avatar (or any other 3D visual representation) of the first participant within a virtual 3D video conference environment.

The generation of the first avatar (or any other 3D visual representation) may be executed in various manners—for example—only by a device of the second participant, only by the device of the first participant, partially by the device of the second participant, partially by the device of the first participant, by a cooperation between the devices of the first and second participants, by another computerized system (such as but not limited to a cloud system or a remote system), and/or any combination of one or more devices.

The inclusion of the avatar (or any other 3D visual representation) within the virtual 3D video conference environment may be executed in various manners—for example—only by a device of the second participant, only by the device of the first participant, partially by the device of the second participant, partially by the device of the first participant, by a cooperation between the devices of the first and second participants, by another device (such as but not limited to a cloud device or a remote device), and/or any combination of one or more devices.

Any reference to one manner of execution of any step of the generation of the first avatar and/or any reference to one manner of execution of any step of the inclusion of the avatar within the virtual 3D video conference environment may be applied mutatis mutandis to any other manner of execution.

The generation of the first avatar and/or the inclusion of the first avatar may be responsive to information gained by the device of the first user or to a camera or sensor associated with the device of the first user. A non-limiting example of information may include information regarding the first participant and/or information regarding to the acquisition of images of the first participant (for example camera setting, illumination and/or ambient conditions).

The system may include multiple user devices and/or intermediate devices such as servers, cloud computers, and the like.

FIG. 1 illustrates an example of method 200.

Method 200 is for conducting a three-dimensional video conference between multiple participants.

Method 200 may include steps 210, 220 and 230.

Step 210 may include receiving direction of gaze information regarding a direction of gaze of each participant within a representation of a virtual 3D video conference environment that is associated with the participant.

The representation of a virtual 3D video conference environment that is associated with the participant is a representation that is shown to the participant. Different participants may be associated with different representation of a virtual 3D video conference environment.

The direction of gaze information may represent a detected direction of gaze of the participant.

The direction of gaze information may represent an estimated direction of gaze of the participant.

Step 220 may include determining, for each participant, updated 3D participant representation information within the virtual 3D video conference environment, which reflects the direction of gaze of the participant. Step 220 may include estimating how the virtual 3D video conference environment will be seen from the direction of gaze of the participant.

Step 230 may include generating, for at least one participant, an updated representation of virtual 3D video conference environment, the updated representation of virtual 3D video conference environment represents the updated 3D participant representation information for at least some of the multiple participants. Step 230 may include rendering images of the virtual 3D video conference environment for at least some of the multiple participants. Alternatively-step 230 may include generating input information (such as 3D model and/or one or more texture maps) to be fed to a rendering process.

Method 200 may also include step 240 of displaying, by a device of a participant of the multiple participants, an updated representation of the virtual 3D video conference environment, the updated representation may be associated with the participant.

Method 200 may include step 250 of transmitting the updated representation of virtual 3D video conference environment to at least one device of at least one participant.

The multiple participants may be associated with multiple participant devices, wherein the receiving and determining may be executed by at least some of the multiple participant devices. Any step of method 200 may be executed by at least some of the multiple participant device or by another computerized system.

The multiple participants may be associated with multiple participant devices, wherein the receiving and determining may be executed by a computerized system that differs from any of the multiple participant devices.

Method 200 may include one of more additional steps-collectively denoted 290.

The one or more additional steps may include at least one out of:

a. Determining a field of view of a third participant within the virtual 3D video conference environment.

b. Setting a third updated representation of the virtual 3D video conference environment that may be sent to a third participant device to reflect the field of view of the third participant.

c. Receiving initial 3D participant representation information for generating the 3D representation of the participant under different circumstances. The different circumstances may include at least one out of (a) different image acquisition conditions (different illumination and/or collection conditions), (b) different directions of gaze, (c) different expressions, and the like.

d. Receiving in run time, circumstances metadata; and amending, in real time, the updated 3D participant representation information based on the circumstances metadata.

e. Repetitively selecting for each participant, a selected 3D model out of multiple 3D models of the participant.

f. Repetitively smoothing a transition from one selected 3D model of the participant to another 3D model of the participant.

g. Selecting an output of at least one neural network of the multiple neural networks based on a required resolution.

h. Receiving or generating participants appearance information about head poses and expressions of the participants.

i. Determining the updated 3D participant representation information to reflect the participant appearance information.

j. Determine a shape of each of the avatars that represent the participants.

k. Determining relevancy of segments of updated 3D participant representation information.
l. Selecting which segments to transmit, based on the relevancy and available resources.
m. Generating a 3D model and one or more texture maps of 3D participant representation information of a participant.
n. Estimating 3D participant representation information of one or more hidden areas of a face of a participant.
o. Estimating 3D model hidden areas and one or more hidden parts texture maps.
p. Determining a size of the avatar.
q. Receiving audio information regarding audio from the participants and appearance information.
r. Synchronizing between the audio and the 3D participant representation information.
s. Estimating face expressions of the participants based on audio from the participants.
t. Estimating movements of the participants.

The receiving of the 3D participant representation information may be done during an initialization step.

The initial 3D participant representation information may include an initial 3D model and one or more initial texture maps.

The 3D participant representation information may include a 3D model and one or more texture maps.

The 3D model may have separate parameters for shape, pose and expression.

Each of the one or more texture maps may be selected and/or augmented based on at least one out of shape, pose and expression.

Each of the one or more texture maps may be selected and/or augmented based on at least one out of shape, pose, expression and angular relationship between a face of the participant and an optical axis of a camera that captures an image of face of the participant.

The determining, for each participant, of the updated 3D participant representation information may include at least one of the following:
a. Using one or more neural network for determining the updated 3D participant representation information.
b. Using multiple neural networks for determining the updated 3D participant representation information, wherein different neural networks of the multiple neural networks may be associated with different circumstances.
c. Using multiple neural networks for determining the updated 3D participant representation information, wherein different neural networks of the multiple neural networks may be associated with different resolutions.

The updated representation of the virtual 3D video conference environment may include an avatar per participant of the at least some of the multiple participants.

A direction of gaze of an avatar within the virtual 3D video conference environment may represent a spatial relationship between a (a) direction of gaze of a participant that may be represented by the avatar and (b) a representation of the virtual 3D video conference environment displayed to the participant.

The direction of gaze of an avatar within the virtual 3D video conference environment may be agnostic to an optical axis of a camera that captured a head of the participant.

An avatar of a participant within the updated representation of the virtual 3D video conference environment may appear in the updated representation of the virtual 3D video conference environment as being captured by a virtual camera located on a virtual plane that crosses the eyes of the first participant. Accordingly—the virtual camera and the eye may be located, for example at the same height.

The updated 3D participant representation information may be compressed.

The updated representation of the virtual 3D video conference environment may be compressed.

The generating of the 3D model and one or more texture maps may be based on images of the participant that were acquired under different circumstances.

The different circumstances may include different viewing directions of a camera that acquired the images, different poses, and different expressions of the participant.

The estimating of the 3D participant representation information of one or more hidden areas may be executed by using one or more generative adversarial networks.

The determining, for each participant, of the updated 3D participant representation information may include at least one out of:
a. Applying a super-resolution technique.
b. Applying noise removal.
c. Changing an illumination condition.
d. Adding or changing wearable item information.
e. adding or changing make up information.

The updated 3D participant representation information may be encrypted.

The updated representation of virtual 3D video conference environment may be encrypted.

The appearance information may be about head poses and expressions of the participants and/or be about lip movements of the participants.

The estimating face expressions of the participants based on audio from the participants may be executed by a neural network trained to map audio parameters to face expression parameters.

FIG. 2 illustrates an example of a computational environment that include users devices 4000(1)-4000(R) of users 4010(1)-4010(R). Index r ranges between 1 and R, R being a positive integer. The r'th user device 4000(r) may be any computerized device that may include one or more processing circuit 4001(r), a memory 4002(r), a man machine interface such as a display 4003(r), and one or more sensors such as camera 4004(r). The r'th user 4010(r) is associated with (uses) the r'th user device 4000(r). The camera may belong to the man machine interface.

The users devices 4000(1)-4000(R) and a remote computerized system 4100 may communicate over one or more networks such as network 4050. The one or more networks may be any type of networks—the Internet, a wired network, a wireless network, a local area network, a global network, and the like.

The remote computerized system may include one or more processing circuits 4101(1), a memory 4101(2), and may include any other component.

Any one of the users devices 4000(1)-4000(R) and a remote computerized system 4100 may participate in the execution of any method illustrated in the specification. Participate means executing at least one step of any of said methods.

Any processing circuit may be used—one or more network processors, non-neural network processors, rendering engines, image processors and the like.

One or more neural networks may be located at a user device, at multiple users devices, at a computerized system outside any of the user devices, and the like.

Figure 3:
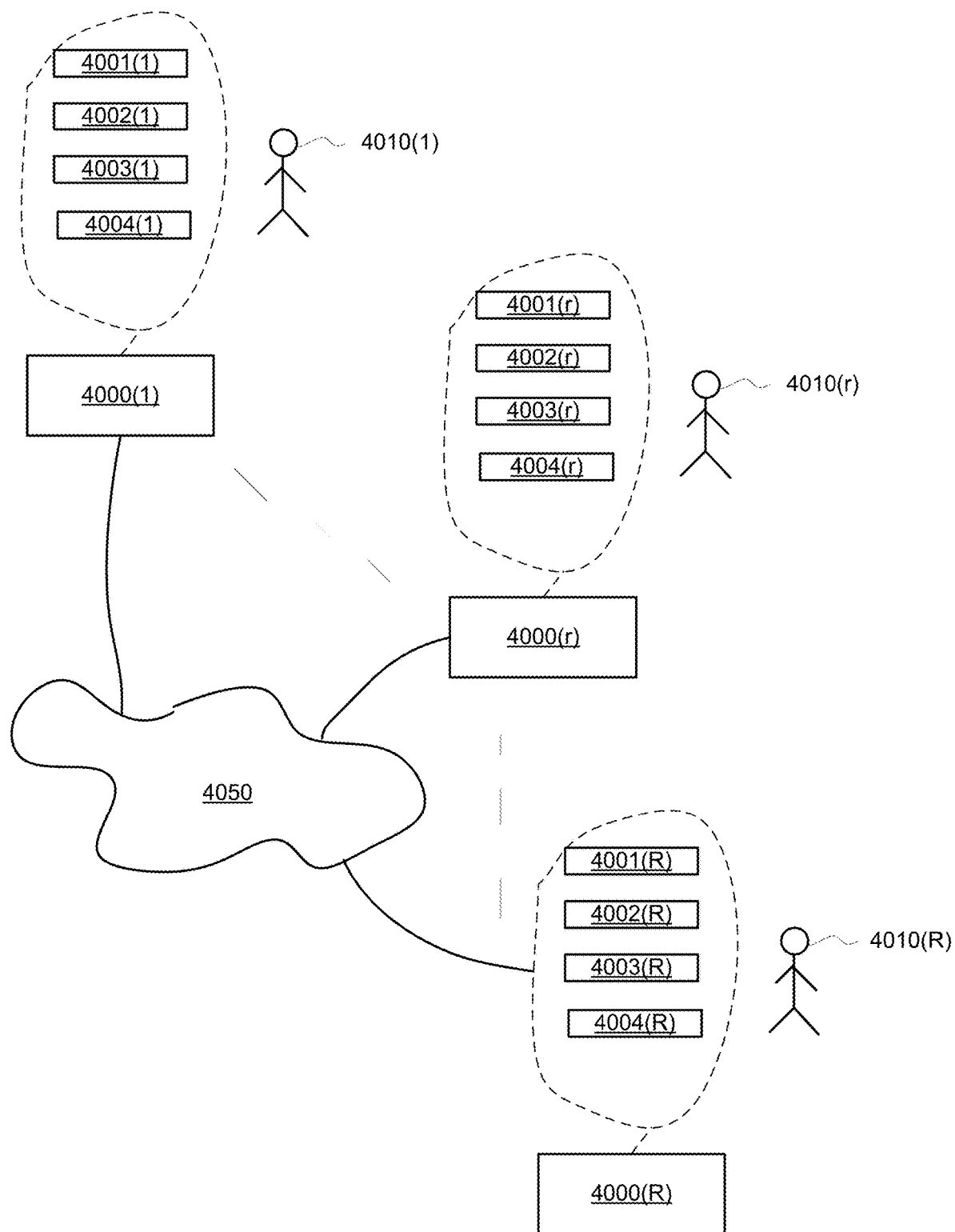
FIG. 3 illustrates an example of a computerized environment.

FIG. 3 illustrates an example of a computational environment that include users devices 4000(1)-4000(R) of users

4010(1)-4010(R). Index r ranges between 1 and R, R being a positive integer. The r'th user device 4000(r) may be any computerized device that may include one or more processing circuit 4001(r), a memory 4002(r), a man machine interface such as a display 4003(r), and one or more sensors such as camera 4004(r). The r'th user 4010(r) is associated with (uses) the r'th user device 4000(r).

The users devices 4000(1)-4000(R) may communicate over one or more networks such as network 4050.

Any one of the users devices 4000(1)-4000(R) may participate in the execution of any method illustrated in the specification. Participate means executing at least one step of any of said methods.

Figure 4:
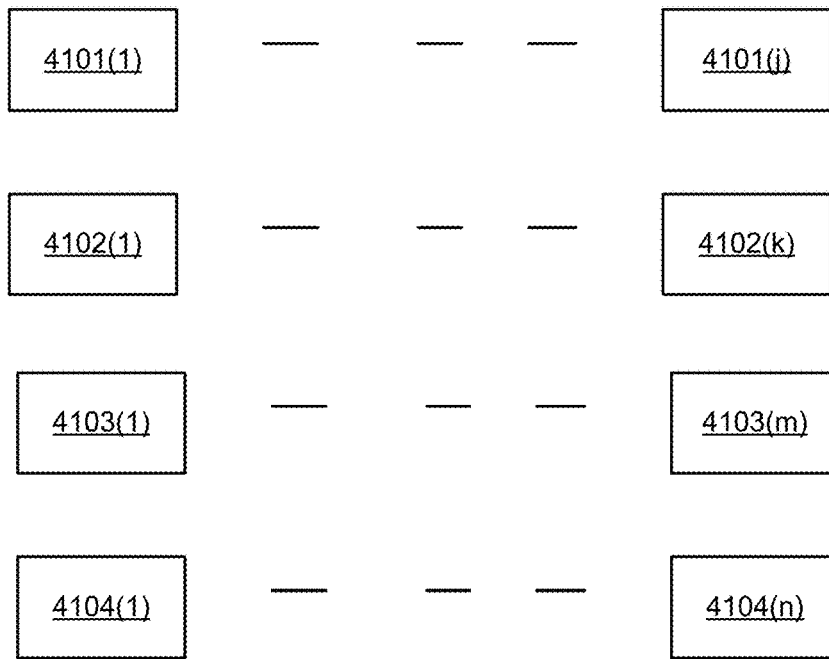
FIG. 4 illustrates an example of data structures.

FIG. 4 illustrates an example of various data structures. The data structures may include user avatars 4101(1)-4101(j), texture maps 4102(1)-4102(k), 3D models 4103(1)-4103(m), 3D representations of objects 4104(1)-4104(n), and any mapping or other data structures mentioned in the application.

Any user may be associated with one or more data structure of any type-avatar, 3D model, texture map, and the like.

Some of the examples refer to a virtual 3D video conference environment such as a meeting room, restaurant, cafe, concert, party, external or imaginary environment in which the users are set. Each participant may choose or be otherwise associated with a virtual or actual background and/or may select or otherwise receive any virtual or actual background in which avatars related to at least some of the participants are displayed. The virtual 3D video conference environment may include one or more avatars that represents one or more of the participants. The one or more avatars may be virtually located within the virtual 3D video conference environment. One or more features of the virtual 3D video conference environment (that may or may not be related to the avatars) may differ from one participant to another.

Either the full body, the upper part of the body or just the face of the users are seen in this environment-thus an avatar may include full body of a participant, the upper part of a body of the participant body or just the face of the participant.

Within the virtual 3D video conference environment there may be provided an improved visual interaction between users that may emulate the visual interaction that exists between actual users that are actually positioned near each other. This may include creating or ceasing to have eye-contact, expressions directed at specific users and the like.

In a video conference call between different users, each user may be provided with a view of one or more other users—and the system may determine (based on gaze direction and the virtual environment)—where the user looks (for example at one of the other users—at none of the users, at a screen showing a presentation, at a whiteboard, etc.)—and this is reflected by the virtual representation (3D model) of the user within the virtual environment—so that other users may determine where the user is looking.

Figure 5:
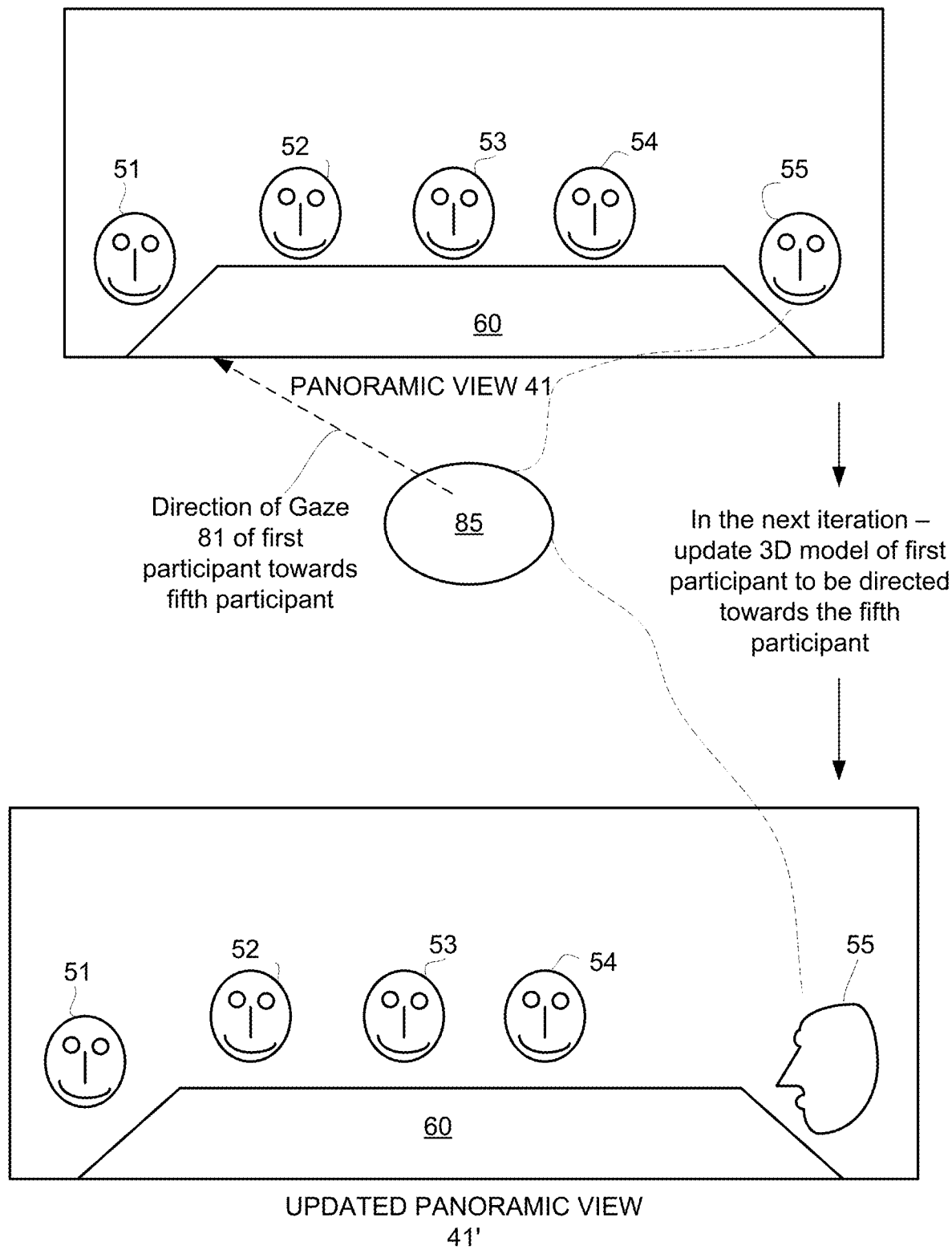
FIG. 5 illustrates an example of a process for amending a direction of view of a 3D model of a part of a participant according to a direction of gaze of the participant.

FIG. 5 illustrates an example of a process for amending a direction of view of an avatar of a part of a participant according to a direction of gaze of the participant. The upper part of FIG. 5 is a virtual 3D video conference environment—represented by a panoramic view 41 of five participants 51, 52, 53, 54 and 55 sitting near table 60. All participants face the same direction—the screen.

In the lower image the avatar of the fifth participant faces the avatar of first participant—as the fifth participant was detected to look at the 3D model of the first participant within the environment as presented to the fifth participant.

Tracking the user's eyes and gaze direction may also be used to determine the direction in which the user is looking (direction of gaze) and at which person or object the user is looking. This information can be used to rotate the avatar's head and eyes so that in the virtual space it also appears as if the user is looking at the same person or object as in the real world.

Tracking the user's head pose and eye gaze may also be used to control the virtual world's appearance on the user's screen. For example, if the user looks at the right side of the screen, the point of view of the virtual camera may move to the right, so that the person or object at which the user is looking is located at the center of the user's screen.

The rendering of a user's head, body, and hands from a certain point of view that is different than the original point of view of the camera may be done in different ways, as described below:

In one embodiment, a 3D model and texture maps are created before the beginning of the meeting and this model is then animated and rendered at run time according to the user's pose and expressions that are estimated from the video images.

A texture map is a 2D image in which each color pixel represents the red, green and blue reflectance coefficients of a certain area in the 3D model. An example of a texture map is shown in FIG. 20. Each color pixel in the texture map corresponds to certain coordinates within a specific polygon (e.g., triangle) on the surface of the 3D model.

Generally, each pixel in the texture map has an index of the triangle to which it is mapped and 3 coordinates defining its exact location within the triangle.

A 3D model composed of a fixed number of triangles and vertices may be deformed as the 3D model changes. For example, a 3D model of a face may be deformed as the face changes its expression. Nevertheless, the pixels in the texture map correspond to the same locations in the same triangles, even though the 3D locations of the triangles change as the expression of the face changes.

Texture maps may be constant or may vary as a function of time, expression or of viewing angle. In any case, the correspondence of a given pixel in a texture map and a certain coordinate in a certain triangle in the 3D model doesn't change.

In yet another embodiment, a new view is created based on a real-time image obtained from a video camera and the position of the new point of view (virtual camera).

In order to best match between the audio and the lip movement and facial expressions, the audio and video that is created from the rendering of the 3D models based on the pose and expressions parameters are synchronized. The synchronization may be done by packaging the 3D model parameters and the audio in one packet corresponding to the same time frame or by adding time stamps to each of the data sources.

To further improve the natural appearance of the rendered model, a neural network may be trained to estimate the facial expression coefficients based on the audio. This can be done by training the neural network using a database of videos of people talking and the corresponding audio of this speech. The videos may be of the participant that should be represented by an avatar or of other people. Given enough examples, the network learns the correspondence between the audio (i.e. phonemes) and the corresponding face movements, especially the lip movements. Such a trained network would enable to continuously render the facial expressions and specifically the lip movements even when the video quality is low or when part of the face is obstructed to the original video camera.

In yet another embodiment, a neural network can be trained to estimate the audio sound from the lip and throat movements or from any other facial cues, as is done by professional lip readers. This would enable to create or improve the quality of the audio when the audio is broken or when there are background noises that reduce its quality.

In yet another embodiment a neural network is trained to compress audio by finding a latent vector of parameters from which the audio can be reconstructed at a high quality. Such a network could serve to compress audio at a lower bit rate than possible with standard audio compression methods for a given audio quality or obtain a higher audio quality for a given bit rate.

Such a network may be trained to compress the audio signal to a fixed number of coefficients, subject to the speech being as similar as possible to the original speech under a certain cost function.

The transformation of the speech to a set of parameters may be a nonlinear function and not just a linear transformation as is common in standard speech compression algorithms. One example would be that the network would need to learn and define a set of base vectors which form a spanning set of spoken audio.

The parameters then would be the vectorial coefficients of the audio as spanned by this set.

FIG. 6 illustrates method 2001.

Method 2001 is for conducting a 3D video conference between multiple participants, the method may include steps 2011 and 2021.

Step 2011 may include determining, for each participant, updated 3D participant representation information within the virtual 3D video conference environment, which represents participant. The determining may be based on audio generated by the participants and appearance information about appearance of the participants.

Step 2021 may include generating, for at least one participant, an updated representation of virtual 3D video conference environment, the updated representation of virtual 3D video conference environment represents the updated 3D participant representation information for at least some of the multiple participants. For example, any movement by the participant may expose or collude parts of the environment. Additionally, movements by participant may affect lighting in the room as the movements may modify the exposure to light of different parts of the environment.

The method may include matching between the audio from a certain participant and appearance information of a certain participant.

The appearance information may be about head poses and expressions of the participants.

The appearance information may be about lip movements of the participants.

Communications System Based on the 3D Models.

During the communication session, i.e., a 3D video conference call between several users, a 2D or 3D camera (or several cameras) grabs videos of the users. From these videos a 3D model (for example—the best fitting 3D model) of the user may be created at a high frequency, e.g., at a frame rate of 15 to 120 fps.

Temporal filters or temporal constraints in the neural network may be used to assure a smooth transition between the parameters of the model corresponding to the video frames in order to create a smooth temporal reconstruction and avoid jerkiness of the result.

The real-time parametric model together with the reflectance map and other maps may be used to render a visual representation of the face and body that may be very close to the original image of the face and body in the video.

Since this may be a parametric model, it may be represented by a small number of parameters. Typically, less than 300 parameters may be used to create a high-quality model of the face including each person's shape, expression and pose.

These parameters may be further compressed using quantization and entropy coding such as a Huffman or arithmetic coder.

The parameters may be ordered according to their importance and the number of parameters that may be transmitted and the number of bits per parameter may vary according to the available bandwidth.

In addition, instead of coding the parameters' values, the differences of these values between consecutive video frames may be coded.

The model's parameters may be transmitted to all other user devices directly or to a central server. This may save a lot of bandwidth as instead of sending the entire model of the actual high-quality image during the entire conference call-much fewer bits representing the parameters may be transmitted. This may also guarantee a high quality of the video conference call, even when the current available bandwidth may be low.

Transmitting the model parameters directly to the other users instead of via a central server may reduce the latency by about 50%.

The other user devices may reconstruct the appearance of the other users from the 3D model parameters and the corresponding reflectance maps. Since the reflectance maps, representing such things as a person's skin color change very slowly, they may be transmitted only once at the beginning of the session or at a low updating frequency according to changes that occur in these reflectance maps.

In addition, the reflectance maps and other maps may be updated only partially, e.g., according to the areas that have changed or according to semantic maps representing body parts. For example, the face may be updated but the hair or body that may be less important for reconstructing emotions may not be updated or may be updated at a lower frequency.

In some cases, the bandwidth available for transmission may be limited. Under such conditions, it may be useful to order the parameters to transmit according to some prioritization and then transmit the parameters in this order as the available bandwidth allows. This ordering may be done according to their contribution to the visual perception of a realistic video. For example, parameters related to the eyes and lips may have higher perceptual importance than those related to cheeks or hair. This approach would allow for a graceful degradation of the reconstructed video.

The model parameters, video pixels that may be not modelled and audio may be all synchronized.

As a result, the total bandwidth consumed by the transmission of the 3D model parameters may be several hundred bits per second and much lower than the 100 kbps-3 Mbps that may be typically used for video compression.

A parametric model of the user's speech may also be used to compress the user's speech beyond what may be possible with a generic speech compression method. This would further reduce the required bandwidth required for video and audio conferencing. For example, a neural network may be used to compress the speech into a limited set of parameters from which the speech can be reconstructed. The neural network is trained so that the resulting decompressed speech is closest to the original speech under a specific cost function. The neural network may be a nonlinear function, unlike linear transformations used in common speech compression algorithms.

The transmission of bits for reconstructing the video and audio at the receiving end may be prioritized so that the most important bits may be transmitted or receive a higher quality of service. This may include but may not be limited to prioritizing audio over video, prioritizing of the model parameters over texture maps, prioritizing certain areas of the body or face over others, such as prioritizing information relevant to the lips and eyes of the user.

An optimization method may determine the allocation of bitrate or quality of service to audio, 3D model parameters, texture maps or pixels or coefficients that may be not part of the model in order to ensure an overall optimal experience. For example, as the bitrate is reduced, the optimization algorithm may decide to reduce the resolution or update frequency of the 3D model and ensure a minimal quality of the audio signal.

The users may be provided with one or more views of the virtual 3D video conference environment—whereas the user may or may not select the field of view—for example, a field of view that includes all of the other users or only one or some of the users, and/or may select or may view one or some objects of the virtual 3D video conference environment such as TV screens, whiteboards, etc.

When combining the video pixels and the rendered 3D models, the areas corresponding to the model, the areas corresponding to the video pixels, or both may be processed so that the combination may appear natural and a seam between the different areas would not be apparent. This may include but may be not limited to relighting, blurring, sharpening, denoising or adding noise to one or some of the image components so that the whole image appears to originate from one source.

Each user may use a curved screen or a combination of physical screens to that the user in effect can see a panoramic image showing a 180 or 360 degree view (or any other angular range view) of the virtual 3D video conference environment and/or a narrow field of view image focusing on part of the virtual 3D video conference environment such as a few people, one person, only part of a person, i.e. the person's face, a screen or a whiteboard or any one or more parts of the virtual 3D video conference environment.

The user will be able to control the part or parts of the narrow field of view image or images by using a mouse, a keyboard, a touch pad or a joystick or any other device that allows to pan and zoom in or out of an image.

The user may be able to focus on a certain area in the virtual 3D video conference environment (for example a panoramic image of the virtual 3D video conference environment) by clicking on the appropriate part in the panoramic image.

FIG. 7 illustrates an example of a panoramic view 41 of the virtual 3D video conference environment populated by five participants and a partial view 42 of the some of the participants within the virtual 3D video conference environment. FIG. 7 also illustrates a hybrid view 43 that includes a panoramic view (or a partial view) and expanded images of faces of some of the participants.

The user may be able to pan or zoom using head, eyes, hands, or body gestures. For example, by looking at the right or left part of the screen, the focus area may move to the left or right, so it appears at the center of the screen, and by leaning forward or backwards the focus area may zoom in or out.

The 3D model of the person's body may also assist in correctly segmenting the body and the background. In addition to the model of the body, the segmentation method will learn what objects may be connected to the body, e.g., a person may be holding a phone, pen or paper in front of the camera. These objects will be segmented together with the person and added to the image in the virtual environment, either by using a model of that object or by transmitting the image of the object based on a pixel level representation. This may be in contrast to existing virtual background methods that may be employed in existing video conferencing solutions that may not show objects held by users as these objects are not segmented together with the person but rather as part of the background that has to be replaced by the virtual background.

Segmentation methods typically use some metric that needs to be exceeded in order for pixels to be considered as belonging to the same segment. However, the segmentation method may also use other approaches, such as Fuzzy Logic, where the segmentation method only outputs a probability that pixels belong to the same segment. If the method detects an area of pixels with a probability that makes it unclear if it and it is not sure whether the area should be segmented as part of the foreground or background, the user may be asked how to segment this area.

As part of the segmentation process, objects such as earphones, cables connected to the earphones, microphones, 3D glasses or VR headsets may be detected by a method. These objects may be removed in the modelling and rendering processes so that the image viewed by viewers does not include these objects. The option to show or eliminate such objects may be selected by users or may be determined in any other manner—for example based on selection previously made by the user, by other users, and the like.

If the method detects more than one person in the image, it may ask the user whether to include that person or people in the foreground and in the virtual 3D video conference environment or whether to segment them out of the image and outside of the virtual 3D video conference environment.

In addition to using the shape or geometrical features of objects in order to decide whether they may be part of the foreground or background, the method may also be assisted by knowledge about the temporal changes of the brightness and color of these objects. Objects that do not move or change have a higher probability of being part of the background, e.g., part of the room in which the user may be sitting, while areas where motion or temporal changes may be detected may be considered to have a higher probability of belonging to the foreground. For example, a standing lamp would not be seen as moving at all and it would be considered part of the background. A dog walking around the room would be in motion and considered part of the foreground, In some cases periodic repetitive changes or motion may be detected, for example where a fan rotates, and these areas may be considered to have a higher probability of belonging to the background.

The system will learn the preferences of the user and use the feedback regarding which objects, textures or pixels may be part of the foreground and which may be part of the background and use this knowledge in order to improve the segmentation process in the future. A learning method such as a Convolutional Neural Network or other machine learning method may learn what objects may be typically chosen by users as parts of the foreground and what objects may be typically chosen by users as part of the background and use this knowledge to improve the segmentation method.

The processing of this system may be performed on the user's device such as a computer, a phone or a tablet or on a remote computer such as a server on the cloud. The computations may also be divided and/or shared between the user's device and a remote computer, or they may be performed on the user's device for users with appropriate hardware and on the cloud (or in any other computation environment) for other users.

The estimation of the body and head parameters may be done based on compressed or uncompressed images. Specifically, they can be performed on compressed video on a remote computer such as a central computer on the cloud or another user's device. This would allow normal video conferencing systems to send compressed video to the cloud or another user's computer where all the modelling, rendering and processing would be performed.

Gaze Detection in Video Conferencing

Video conferencing is a leading method for executing meetings of all kinds. This is especially true with the globalization of working environments and has been enhanced with the appearance of the Covid-19 virus.

With the increase of importance of video conferencing systems, new methods of implementing them are being introduced. These include 3D environments, where the video conference appears to be held in a virtual setting. The participants also appear as 3D figures within the virtual environment, usually represented as avatars. In order for this kind of system to give participants a sensation of a real face-to-face meeting, it is important to understand where each participant is looking and to have the avatar look at the same place and with the same head orientation and movements as detailed below.

Prior art solutions are limited to understanding of where viewers look at the screen.

DOF—Degrees of Freedom
  6 DOF—relative to a coordinate system, a person's head can have 6 degrees of freedom. Three of these are the X, Y and Z location of a predefined point in the head (e.g., the tip of the nose or the right extreme point of one of the eyes, etc.) The other three degrees of freedom are rotations around these axes. These are often known as Pitch, Yaw and Roll.
  8 DOF—in addition to the 6 DOF, there are two additional degrees of freedom that help define a person's gaze. These additional degrees of freedom are necessary because the eyes do not necessarily look directly forward at all times.

Therefore, one needs to add two rotations of the eyes (Pitch and Yaw). In the most general case, one can say that each eye will have different values for these parameters.

Therefore, the most accurate description would actually be 10 DOF but for the sake of the document, only 8 DOF will be dealt with. In case a person looks at objects that are not in the immediate vicinity of the eyes, one can assume that both eyes have the same values for these parameters. The reduction from 10 DOF to 8 DOF can be done by averaging the values for both eyes or by taking the values of only one of the eyes. All that is written below can be applied to 10 DOF models.

There are known methods for determining where in the screen is the participant looking at. See for example http://developer.tobiipro.com/commonconcepts/calibration.html Solutions such as these only deal with understating at which point in the screen the viewer is looking. They are accomplished by calibrating the sight of the viewer as seen by the camera, with known coordinates of the screen.

Information about the screen size, or specifically the size of the window that is viewed by the viewer can be supplied by all operating systems or can be inferred by information about the screen size and window attributes within the screen.

In order to calculate the line of sight, one needs to find the 8 DOF parameters of the participant and combine that with the point on the screen with the participant is looking at.

The 6 DOF parameters can be obtained in the following manner: X and Y are relative to the camera's coordinates. Z can be obtained by one of the following methods:
  a. For calibration purposes, ask the participant to sit at a defined distance from the camera. This is a one-time process. Following this, Z can be calculated by changes in the size of the head as viewed by the camera.
  b. Use a depth camera. These are more and more ubiquitous nowadays.
  c. Infer the participant's distance from the camera by the size of the participant's head as captured by the camera and compared to an average human's head size. Average numbers can be obtained, for example, here: https://en.wikipedia.org/wiki/Human_head
  d. Assume that the participant is located at a certain distance from the camera (e.g., 55 cm)

The three additional DOF are then easily obtained. This involves finding the Euclidean matrix which describes the movement of the head and is well known in computer graphics and in other areas.

The additional DOF for the eyes can then be found by comparing the pupil locations relative to the center of the eyes.

In order to calculate the line of sight, one assumes a virtual pinhole camera (VCV) located at the geometrical point which is on the participant's face between the participant's eyes. A line is then calculated which joins that virtual camera with the point on the screen the viewer is looking at. Note that, since we are dealing with a virtual 3D video conferencing setting, this virtual camera is also used as a virtual camera (VCP) when deciding what to present to the viewer on the viewer's screen from within the 3D environment. Therefore, the line of sight is also the line of sight within the 3D environment. Under some circumstances and in order to reduce the amount of changes of what is presented to the viewer, VCP may be less prone to movements than VCV and may be located at a slightly different location. Even in these cases, the location of VCP is known and it is straightforward to translate the viewers line of sight from VCV coordinates to a line of sight in the VCP coordinates.

Finding the line of sight is followed by determining what is the viewer looking at. This can be answered by finding the opaque object along the line of sight which is closest to VCV along the line of sight. In order to reduce possible miscalculations, it may be possible to assume that the viewer is looking at a face along or closest to the line of sight.

FIG. 8 illustrates an example where the first and second cameras VCV 4421 and VCP 4422 are mutually aligned. VCV 4421 has an optical axis 4426 and a VCV field of view 4423. VCP 4422 has an optical axis 4427 and a VCP field of view 4424.

FIG. 8 also illustrates avatars 4401, 4402, 4403, 4404 and 4405 of five participants within the virtual 3D video conference environment (V3DVCE), the display 4425 (as virtually appears in the V3DVCE), and an image 4410 that illustrates the displayed representation of the V3DVCE in which the five avatars are illustrated.

FIG. 9 illustrates an example where the first and second cameras VCV 4421 and VCP 4422 are misaligned but have their optical axes and field of views spaced apart but parallel to each other.

Figure 10:
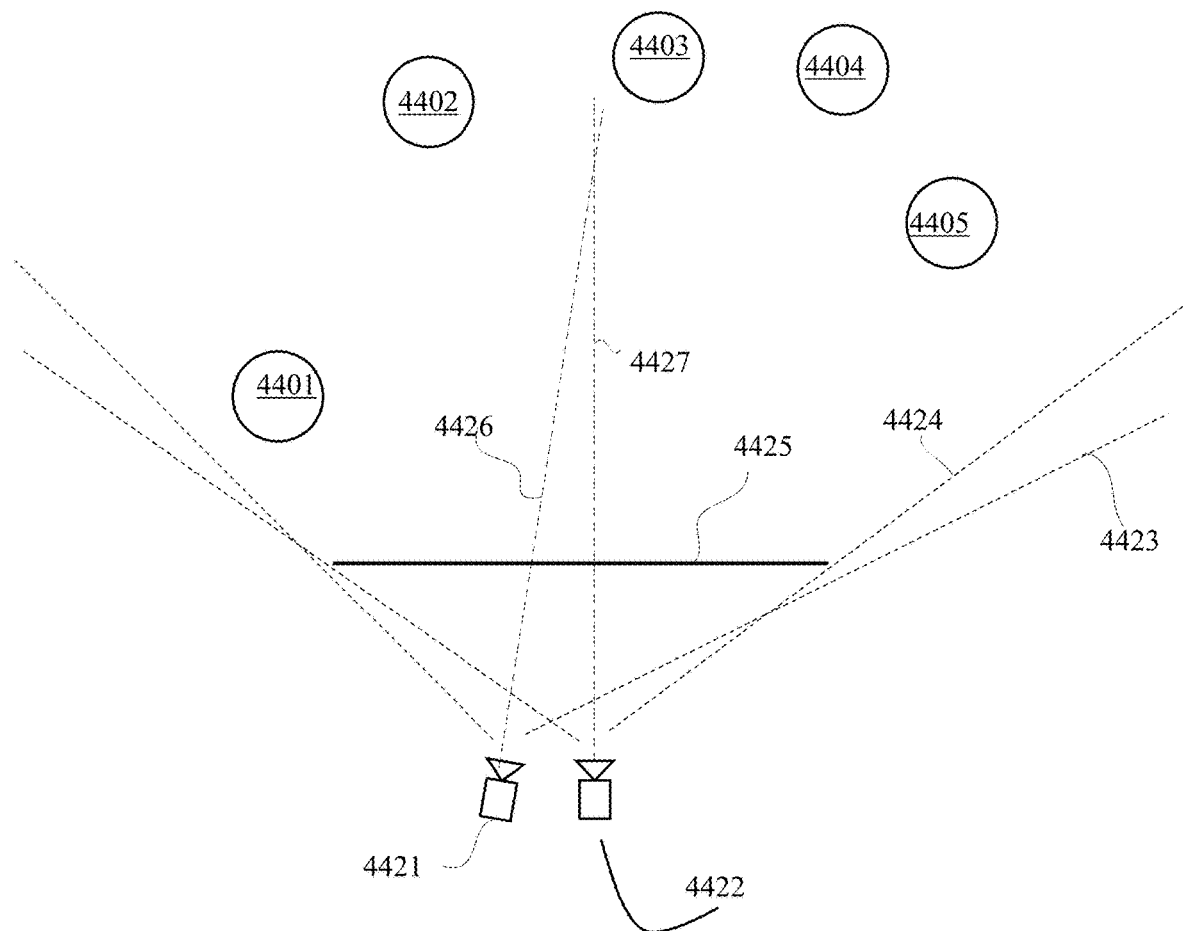
FIG. 10 illustrates two camera, fields of views of the two cameras, avatars and a displayed V3DVCE.

FIG. 10 illustrates an example where the first and second cameras VCV 4421 and VCP 4422 are misaligned but have their optical axes and field of views spaced apart and non-parallel to each other. Misalignment between the VCV and the VCP may occur. Misalignment between them may mean that the optical axis of the VCV is misaligned with the optical axis of the VCP. When this occurs, a gaze related object (or a part of said gaze related object) that can be fully seen by one camera, may be at least partially concealed from the other camera.

Figure 11:
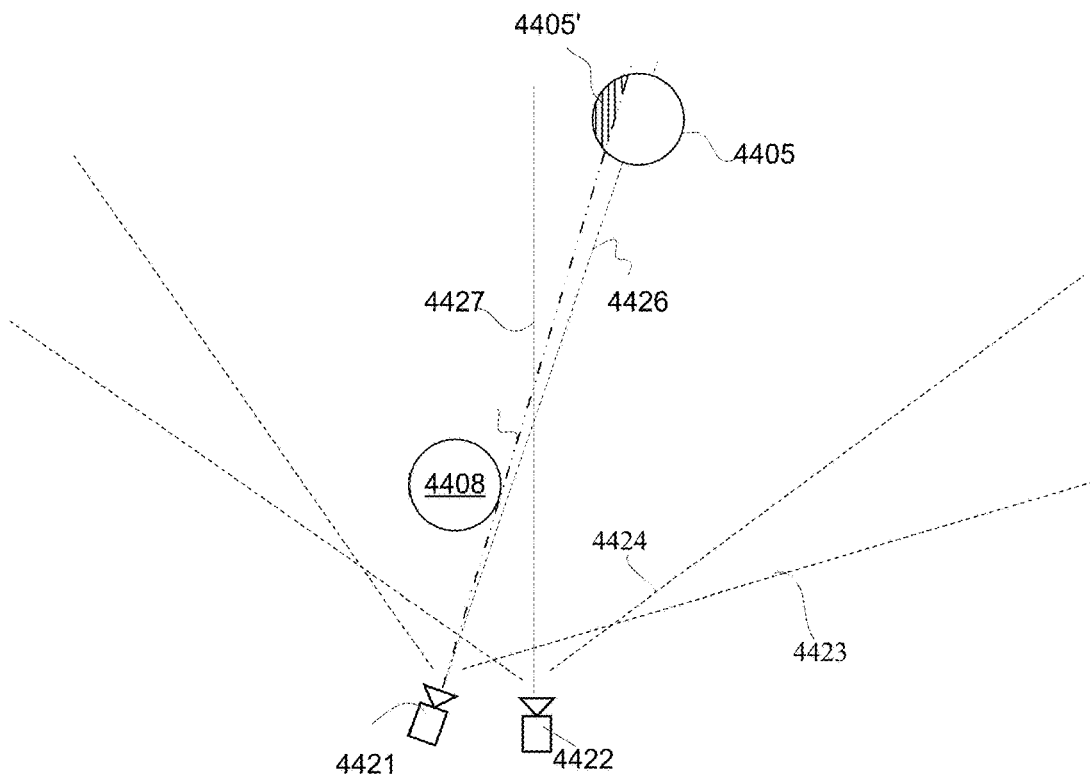
FIG. 11 illustrates two camera, fields of views of the two cameras, avatars and a displayed V3DVCE.

FIG. 11 illustrates an example where the first and second cameras VCV 4421 and VCP 4422 are misaligned, their optical axes and field of views spaced apart and non-parallel to each other, an avatar 4405 (example of a gaze related object) is fully seen by VCP 4422 and is partially concealed (part 4405' is not shown)—due to the presence of another gaze related object 4408.

Figure 12:
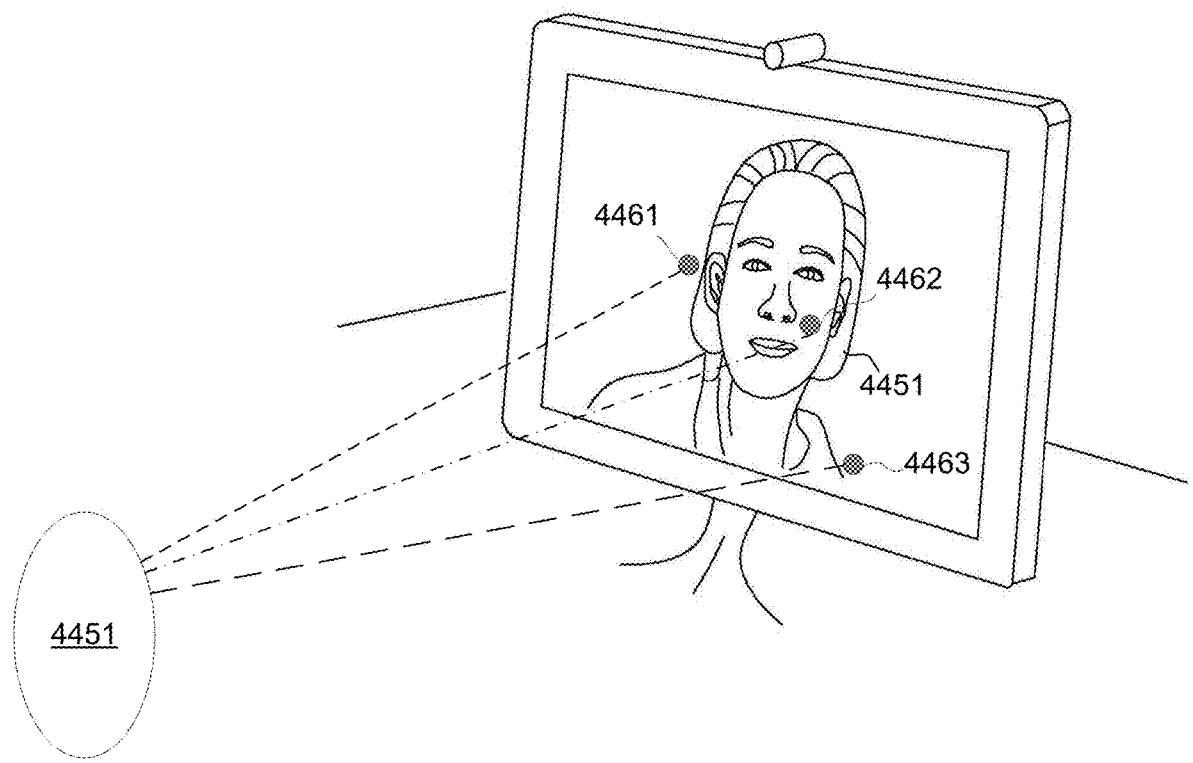
FIG. 12 illustrates a participant and an avatar.

FIG. 12 illustrates a participant 4451 that looks at three different points of time, at points 4461, 4462 and 4463 within the V3DVCE, point 4464 is positioned on the face of avatar 4451, points 4461 and 4463 are located in proximity to avatar 4451—and the method may conclude that the participant looks at the avatar 4451.

Figure 13:
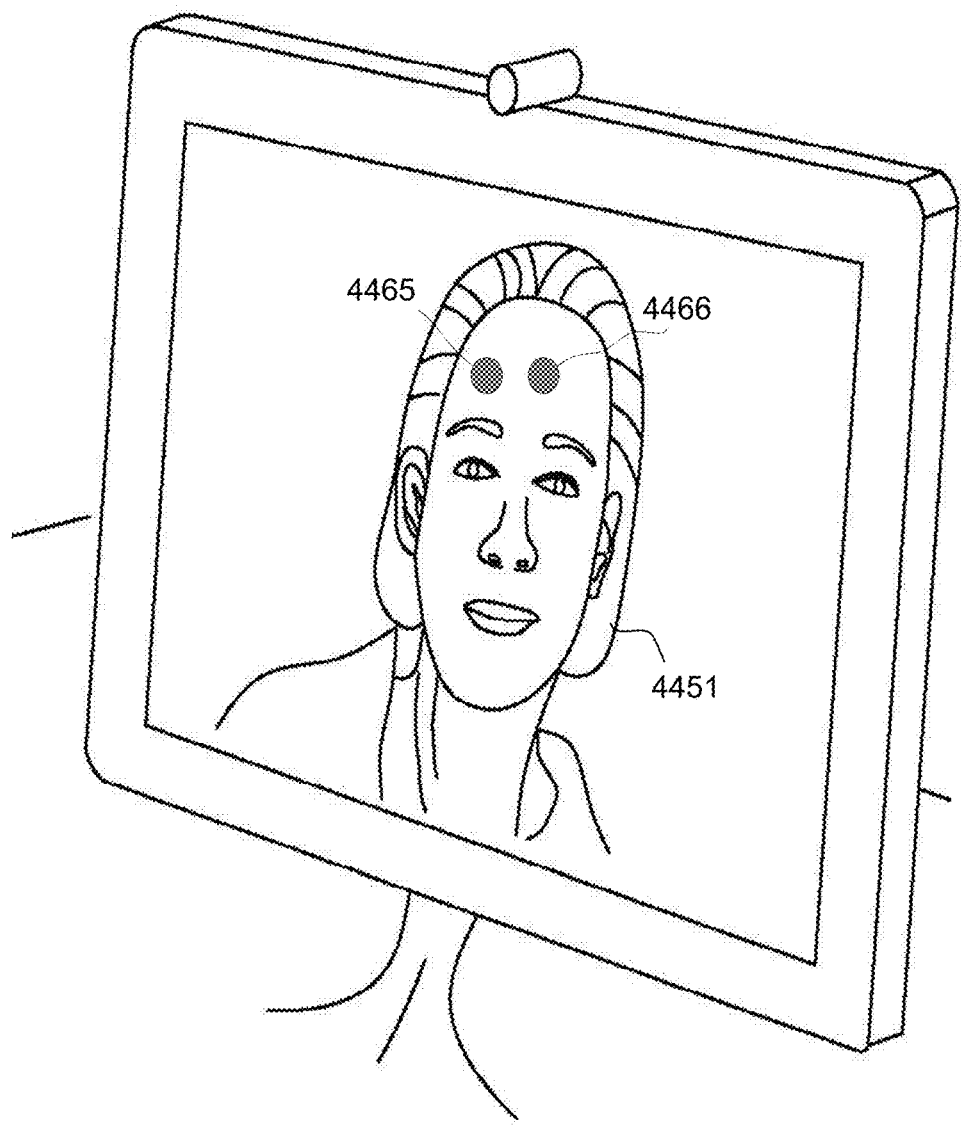
FIG. 13 illustrates points of gaze of a participant and an avatar.

FIG. 13 illustrates different points of gaze of a participant (appearing as points 4465 and 4465 on an avatar 4451 of another participant. The participant has its gaze oscillate between points 4465 and 4466 (on avatar 4451). By applying a temporal filter and/or smoothing—the gaze may be set (for purposes of generating the next displayed version of the V3DVCE) on one point-being one of the points, average point between points 4465 and 4466.

Figure 14:
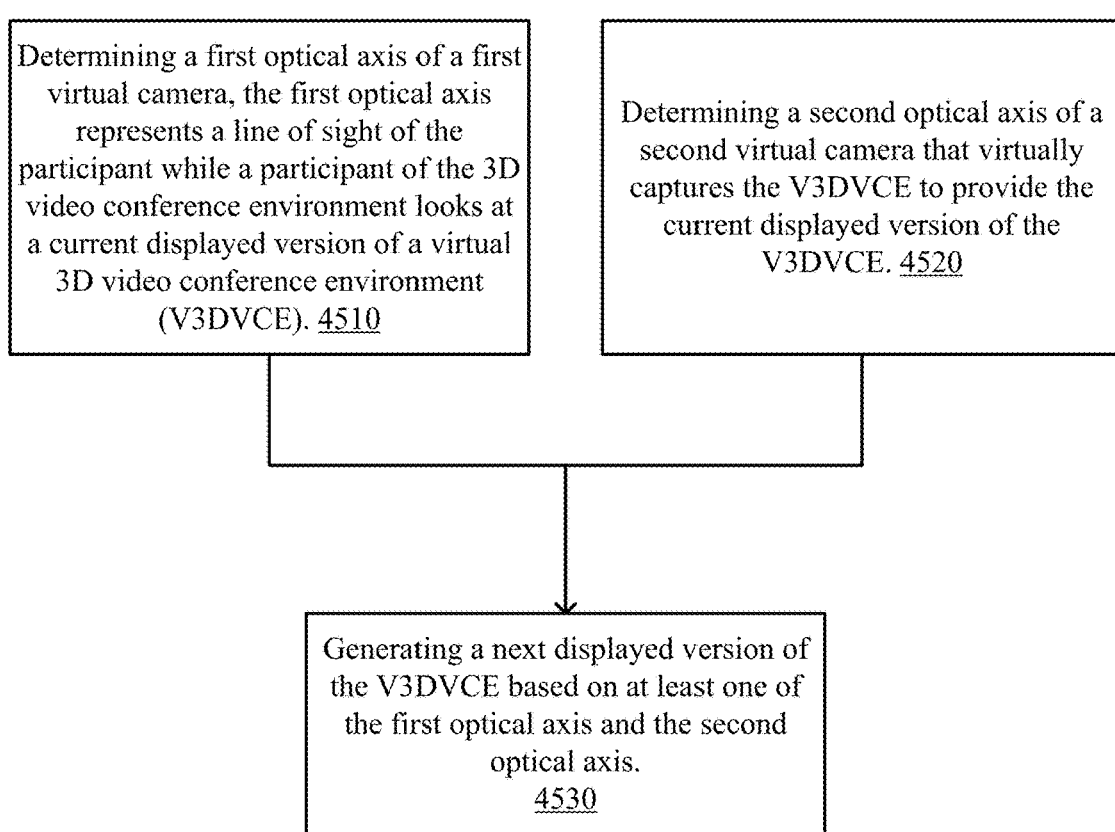
FIG. 14 illustrates an example of a method.

FIG. 14 illustrates method 4500 for virtual 3D video conference environment generation.

Method 4500 may start by steps 4510 and 4520.

Step 4510 may include determining a first optical axis of a first virtual camera, the first optical axis represents a line of sight of the participant while a participant of the 3D video conference environment looks at a current displayed version of a virtual 3D video conference environment (V3DVCE). A current displayed version of the V3DVCE is displayed on a display.

The first virtual camera may be virtually positioned at a geometrical point between both eyes of a participant and on a face of the participant.

Step 4510 may include at least one out of:
  a. Applying a temporal filter on multiple intermediate determinations of the first optical axis, made during a certain time period.
  b. Applying a smoothing operation on multiple intermediate determinations of the first optical axis, made during a certain time period.
  c. Applying a temporal filter on multiple intermediate determinations of a second optical axis, made during the certain time period.

Step 4520 may include determining a second optical axis of a second virtual camera that virtually captures the V3DVCE to provide the current displayed version of the V3DVCE.

The V3DVCE may be displayed in correspondence to the second optical axis.

Steps 4510 and 4520 may be followed by step 4530 of generating a next displayed version of the V3DVCE based on at least one of the first optical axis and the second optical axis.

Steps 4510, 4520 and 4530 may be repeated multiple times—for example during the duration of the 3D video conference. Steps 4510, 4520, 4530 may be repeated each video frame, each multiple video frames, one to tens frames per second, once per second, once per multiple seconds, and the like.

Step 4530 may include at least one out of:
  a. Comparing the second optical axis to the estimate of the line of sight of the participant within V3DVCE. The line of sight may have a first part outside the display.
  b. The comparing may include calculating an estimate of the second optical axis outside the display.
  c. Comparing the line of sight to the estimate of the second optical axis outside the display.
  d. Determining an intersection pixel of the display that intersects with the first optical axis.
  e. Searching for a potential object of interest that is virtually positioned within the V3DVCE in proximity to the line of sight within the V3DVCE, and determining a content of the next displayed version based on the potential object of interest. The potential object of interest may include an avatar. The potential object of interest may not be intersected by the line of sight.
  f. Virtually amending the line of sight to virtually intersect with the potential object of interest.
  g. Determining one or more gaze related objects. A gaze related object is an object that is located within a field of view of the participant, as represented by the direction of gaze of the participant.
  h. Determining whether a gaze related object of the one or more gaze related objects at least partially conceals another gaze related object of the one or more gaze related objects. There may be an angular difference between the first optical axis and the second optical axis. The estimate of the first optical axis in the V3DVCE is an angular difference compensated estimate of the line of sight within the V3DVCE. Step 4530 may include compensating for an angular difference between the first optical axis and the second optical axis The one or more gaze related objects may include:
  a. At least one object that intersects with the estimate of the first optical axis in the V3DVCE.
  b. At least one object that is a face of an avatar of a participant that is located in proximity to the estimate of the first optical axis in the V3DVCE.
  c. At least one object of interest within in the V3DVCE.

In the foregoing specification, the embodiments of the disclosure have been described with reference to specific examples of embodiments of the disclosure. It will, however, be evident that various modifications and changes may be made therein without departing from the broader spirit and scope of the embodiments of the disclosure as set forth in the appended claims.

Learnable Quantized Textures for Real-Time Facial Avatars

During video conferences there may be a need to display avatars of the participants. It is important to render avatars which appear as natural as possible and have them appear in the virtual environment just like real people in real environments.

Various examples related to modeling persons are illustrated below:

a. "Neural Head Avatars from Monocular RGB Videos" by Philip-William Grassal, Malte Prinzler, Titus Leistner, Carsten Rother, Matthias Nießner and Justus Thies, published at arXiv:2112.01554. Such methods require many resources and can't be performed with low-cost equipment in real time.
b. U.S. Pat. No. 10,896,535 that is based on predefined and mandatory key expressions.
c. "Authentic Volumetric Avatars from a Phone Scan", authors Chen Cao, Tomas Simon, Jin Kyu Kim, Gabe Schwartz, Michael Zollhoefer, Shun-Suke Saito, Stephen Lombardi, Shih-En Wei, Danielle Belko, Shoou-I Yu, Yaser Sheikh, And Jason Saragih, published at ACM Trans. Graph., Vol. 41, No. 4, Article 1, publication date: July 2022. This solution is compute-extensive and requires significant time to achieve.
d. "KinectFusion: Real-Time Dense Surface Mapping and Tracking" by Richard A. Newcombe, Shahram Izadi, Otmar Hilliges, David Molyneaux, David Kim, Andrew J. Davison, Pushmeet Kohli, Jamie Shotton, Steve Hodges, and Andrew Fitzgibbon. The article was published on the web site https://www.microsoft.com/en-us/research/wp-content/uploads/2016/02/ismar2011.pdf.
e. "Learning a model of facial shape and expression from 4D scans" by Tianye Li*, Timo Bolkart*, Michael J Black, Hao Li and Javier Romero, published in SIGGRAPH ASIA 2017, Bangkok, Thailand. The Flame model is also accessible via the web site https://flame.is.tue.mpg.de/. This article as well as the website provide information about the Flame model.

In order to be able to render the avatar, it is important to create a model which represents the participant in a most realistic way and be able to use it also to recreated expressions. All this must be done in real-time and in a non-expensive way so that participants can use ubiquitous equipment, such as cell phones and their depth cameras in order to participate in such video conferences.

Producing high-fidelity renderings of humans or objects requires high level-of-details geometric modeling of the underlying surface structure. Immersive telecommunication applications for humans require as-photo-realistic-as-possible renderings, while maintaining minimal hardware requirements and real-time processing and rendering. To this end, a practice traditionally employed in the Video Effects (VFX) and computer games industries, is the utilization of low-poly count geometries. Consequently, a lot of the fine-grain, high-frequency details are baked into the textures instead, and fine geometric detail is painted onto the surface using high quality textures.

An additional challenge to address is the dynamic nature of human face geometry. As the person speaks or changes their expression, the surface geometry (and topology) changes over time, e.g., opening of the jaw, eyebrow raises, eyelid closure, etc. To address this, low-dimensional 3D morphable head models (3DMMs) parameterize the dynamically changing geometry of the head. 3DMMs employ a base of expression vectors, which are used to deform the vertices of the template head model. The coefficients used with the expression base are usually called blendshape coefficients, or expression coefficients.

For example, the Flame model is a parametric model method for modeling of shape, expression, pose and appearance of faces. Originally, it uses meshes of 5000 vertices, 300 parameters for shape and 100 parameters for expression.

One possible way of using such coefficients to create a good texture map is by training a Neural Net to receive the coefficients as input and create a texture map as its output. This method is extremely expensive. The Neural Network needs to output a full texture map (for example, of size 512×512 pixels) which would be very resource consuming.

Figure 15A:
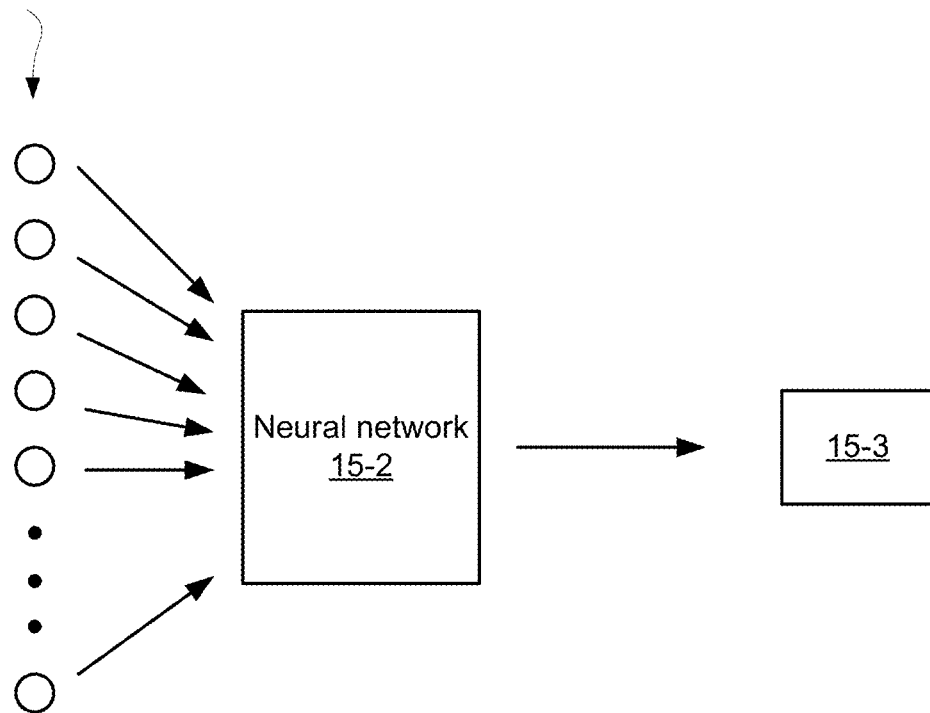
FIG. 15A illustrates an example of texture-map generation.

FIG. 15A illustrates an example of such a solution—100 parameters (collectively denoted 15-1) and converted by a neural network 15-2 to a texture map 15-3. The texture map is a 2D, high resolution, image which is applied on top of a relatively simple 3D model, in order to implement different, lighting, expression and other conditions.

The suggested method is based on base texture maps that span different texture maps which were created from scanned images obtained during training. The scanned images may capture one or more arbitrary expressions of a person. The suggested method provides a greatly simplified solution that does not require the identification of "Key Expressions" which is a specific predefined set of expressions. This simplifies the method and eases the implementation of the method—as it can be based on any video or images in which any arbitrary expressions are captured—and is not bounded by the mandatory and predefined key expressions.

First, the face and head of the person whose avatar is to be created, is scanned while the person makes random expressions. Then, texture maps are created for each of the images captured during the scanning.

The next step includes finding base texture maps. The base texture maps are textures maps that can serve as a mathematical base to span the different texture maps which were created from the scanned images. Different methods exist for finding vectors or matrices that span a larger set of vectors or matrices are known in the art for this and can include direct mathematical methods or using machine learning techniques. The number of Base texture maps can be chosen arbitrarily so that a certain KPI is met. As described in U.S. Pat. No. 10,896,535 the authors used 51 such textures. For the sake of this description, we assume that 128 Base texture maps are created.

Now, in order to render a specific expression, a simple method is used as shown in FIG. 15B. One hundred parameters (other numbers of parameters can be used) are fed to a neural network 16-2 that was trained to output the weights 16-3 which are needed to be applied to J base texture maps (16-4-1 till 16-4-J, J being a positive integer larger than 1) when they are blended so that a correct texture map 16-5 is created and can be used for rendering. This Neural Network only outputs J (for example 128) values and is therefore much more lightweight-fast and resources needed—than one which outputs texture map images (for example, with 512×512 pixels). Each pixel in the texture map 16-5 is a weighted sum of pixels of the base texture maps located at the same location of that pixel in the J base texture maps.

Additionally, in order to speed up the blending process, only some base texture maps may be used for blending. These may be chosen by different methods: for example, choosing only base texture maps whose weight (for example of P1 . . . P128) are larger than some threshold or using only the N base texture maps with the largest weights or similar methods.

It should be noted that instead of generating texture maps and base texture maps of the entire face—the method may include generating texture maps of different parts of the face based on baseBase texture maps of the different parts of the face—and them combining or merging the different parts. For example, base texture maps can be defined only for the area of the mouth, or the eyes, brow, etc.

Figure 15C:
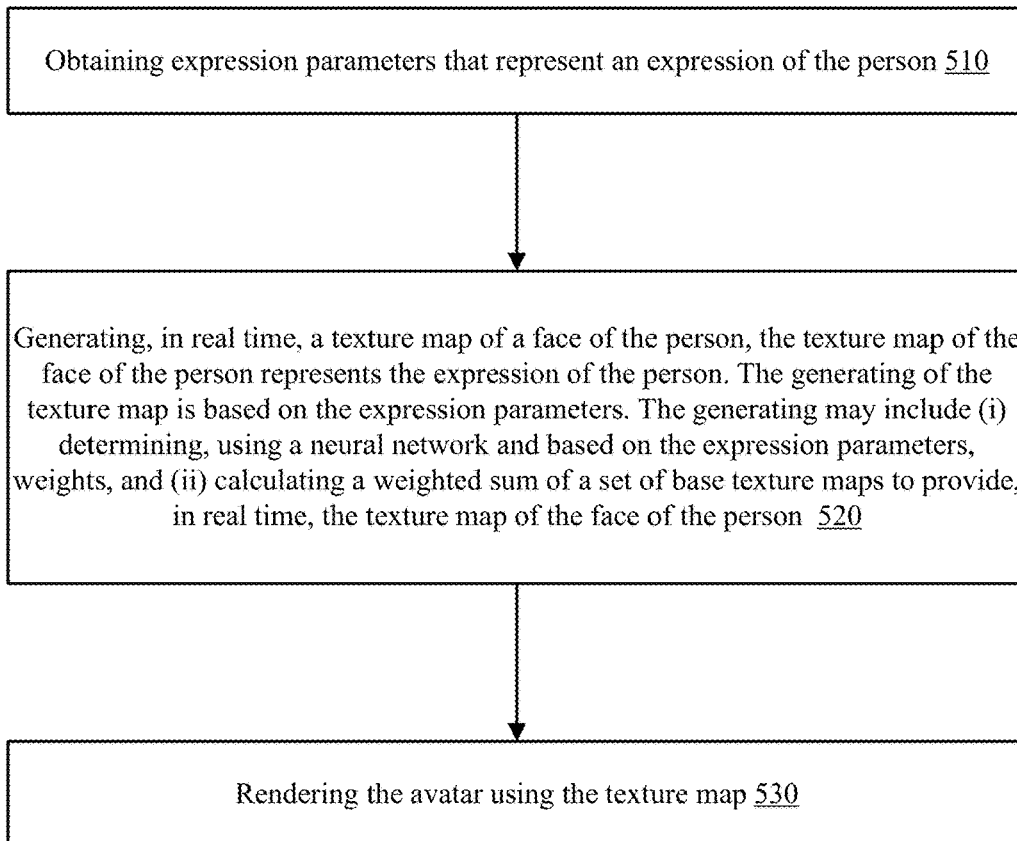
FIG. 15C illustrates an example of a method.

FIG. 15C illustrates an example of method 700 for generating an avatar having expressions that mimics expressions of a person.

Method 500 may start by step 510 of obtaining expression parameters that represent an expression of the person.

The obtaining may include capturing one or more images of the person at one or more points in time and processing the multiple images to determine the expression parameters. When there are multiple images—the multiple images may be a part of a video stream or may be individual images.

The obtaining may include receiving expression parameters without processing the one or more images—for example receiving the expression parameters from the person, or from another entity (computerized or human) that generated the expression parameters.

Step 510 may be followed by step 520 of generating, in real time, a texture map of a face of the person, the texture map of the face of the person represents the expression of the person. The generating of the texture map is based on the expression parameters.

Step 520 may include (i) determining, using a neural network and based on the expression parameters, weights, and (ii) calculating a weighted sum of a set of base texture maps to provide, in real time, the texture map of the face of the person.

In real time—may be multiple times a second—for example one per video frame, 25, 30, 50, 60 or even more times a second.

The set of base texture maps belongs to a group of base texture maps, whereas the group of texture maps mathematically spans acquired texture maps-performs base spanning. The acquired texture maps are calculated based on the images of arbitrary expressions made by the person. The images of the arbitrary expressions made by the person may be acquired during a training process. Any of the acquired texture maps may be expressed as a weighted sum of two or more members of the group of base texture maps. Using a group of base texture maps that spans the acquired texture maps increases the accuracy of a representation of any expression made by the user. This is in contrary of using predefined key expressions that do not provide a good mathematical base for spanning—and result in much less accurate reconstruction of expressions The set of base texture maps may be the entire group of base texture maps that spans different acquired texture maps or may be only a part of the group of base texture maps that spans different acquired texture maps.

The group may include a limited number of base texture maps—for example less than 51, less than 60, less than 80, less than 129, and the like.

The base texture maps may be learnt by applying a machine learning process on the acquired texture maps.

The base texture maps may be learnt by performing mathematical calculations and without applying a machine learning process on the acquired texture maps Step 520 may include selecting the members of the set—for example—based on the weights of the base texture maps.

There is no limitations on the type of the arbitrary expressions and/or of the number of arbitrary expressions. The generation of the set of base texture maps does not require to capture predefined key expressions.

Step 520 may include calculating texture maps of different parts of a face of the person, and converting the texture maps of different parts to the texture map of the face of the person. In this case, step 520 may include executing, for each one of the texture maps of the different parts of the face, (i) determining, using a neural network and based on the expression parameters, weights, and (ii) calculating a weighted sum of a set of base texture maps to provide, in real time, the texture map of the pats of the face of the person.

Step 520 may be followed by step 530 of rendering the avatar using the texture map.

The rendering of step 530 may also use a model of the person. The model of the person may be a template model that does not include expression information. The texture map may be placed on the model.

Low-Cost Accurate Avatar Creation

It may be beneficial to render avatars which appear as natural as possible and have them appear in the virtual environment just like real people in real environments. In order to be able to render the avatar, it is important to create a model which represents the participant in a most realistic way and be able to use it also to recreated expressions. All this must be done in real-time and in a non-expensive way so that participants can use ubiquitous equipment, such as cell phones and their depth cameras in order to participate in such video conferences.

The Flame model is relatively complex and includes many vertices (about 5000) but has an infrastructure that allows to generate an avatar in real time based on parameters such as shape parameters (the current flame model has 300 shape parameters) and expression parameters (the current flame model has 100 expression parameters). The infrastructure is supported by a web site that has an interface allows entering parameters and generates a model as viewed from a specific viewpoint.

There is provided a method that may create a simple non-riggable 3D model using very few resources. Expression can then be added using a highly effective process.

The simple non-riggable model may be used to generate a variable and accurate avatar of a face of a person and does not require modeling the face accurately at the beginning of the process. The simple non-riggable model can be used by adapting a Flame model (or other parametric model) to the face of a person as appears in images of the person (for example—acquired during a conference call) on a frame-by-frame base. This allows for low-cost equipment, such as mobile phones, to be used to create the models In order to create a non-riggable model with low-cost equipment such as a mobile phone depth camera, one can use an over simplistic model of a head and then find the translation and rotation of the camera from one frame to another as it scans the face.

Figure 16A:
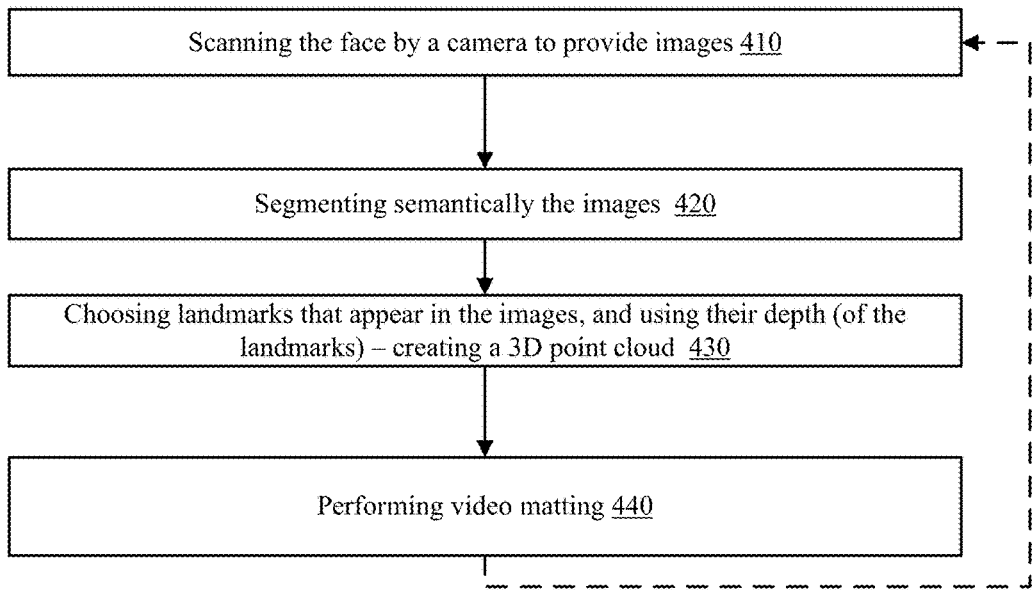
FIG. 16A illustrates an example of a method.
Figure 16B:
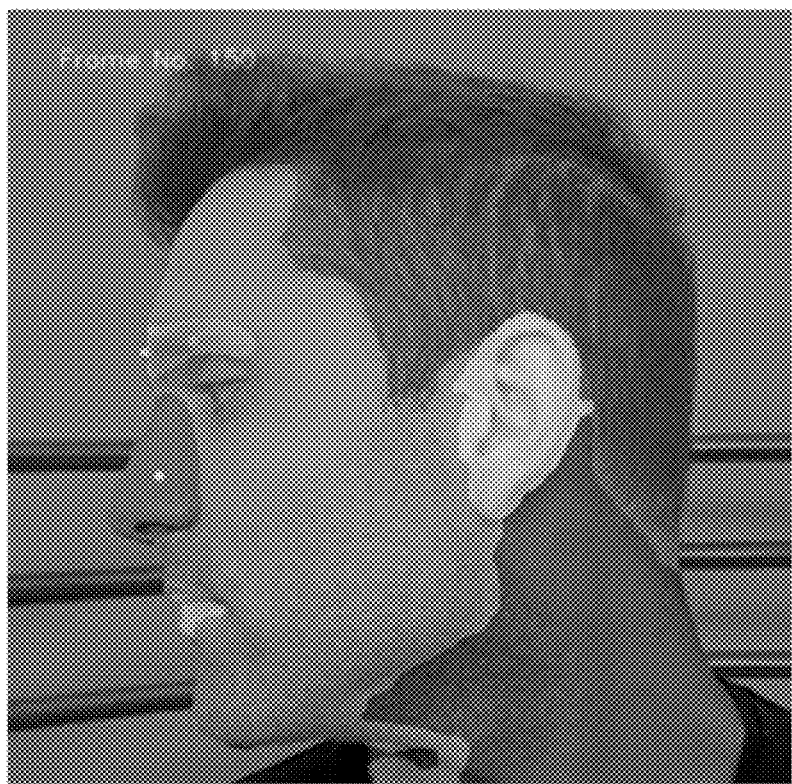
FIGS. 16B-16C illustrate examples of methods.
Figure 16C:
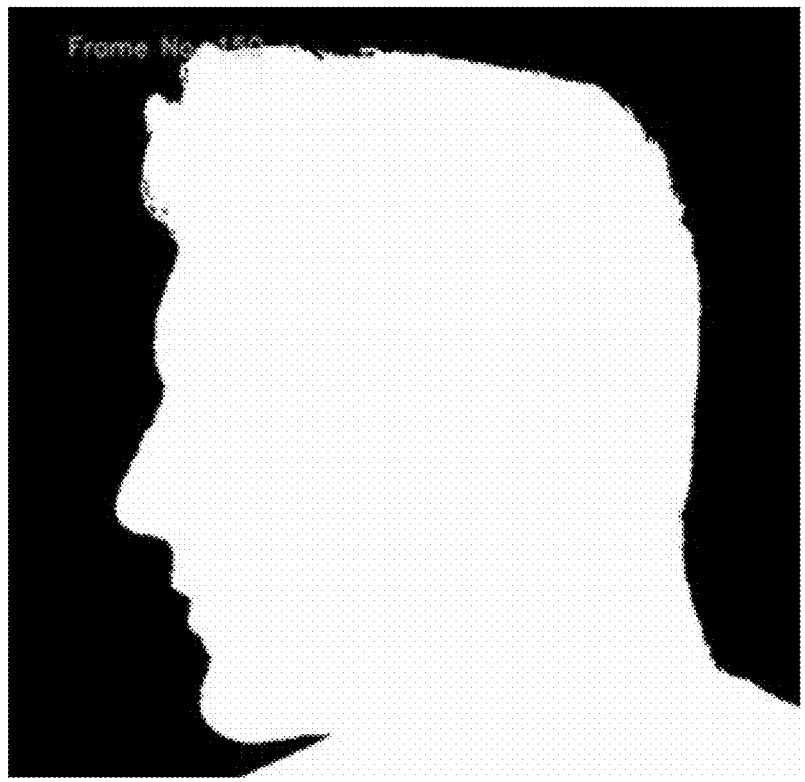

FIG. 16A illustrates an example of a method 400 for the creation of such a model and may include:

a. Step 410 of scanning the face by a camera to provide images.
b. Step 420 of segmenting semantically the images. Generally speaking, this means finding known objects such as eyes, nose, mouth, etc.
c. Step 430 of choosing landmarks that appear in the images, and using their depth—to create a 3D point cloud. FIG. 16B shows an example of such a process. Different areas in the face may be semantically segmented (e.g., nose, ear, hair, eye, eyebrow, upper lip, lower lip).
d. Step 440 of performing video matting. This includes separating the foreground from the background so that only the foreground segments are used for the next step. FIG. 16C shows the image in FIG. 16B after video matting. Only the white part in the image is used next.

The semantic segmentation is used to find the face in the picture. The scanning of the face and head are typically performed by a video camera (such as a phone camera) and objects in the background may be moving on top of the fact that the camera is moving. Therefore, these two stages are necessary to separate the person's head, including the head, from the background. See FIG. 16C. However, any other process which separates the head from the background may be used.

Figure 16D:
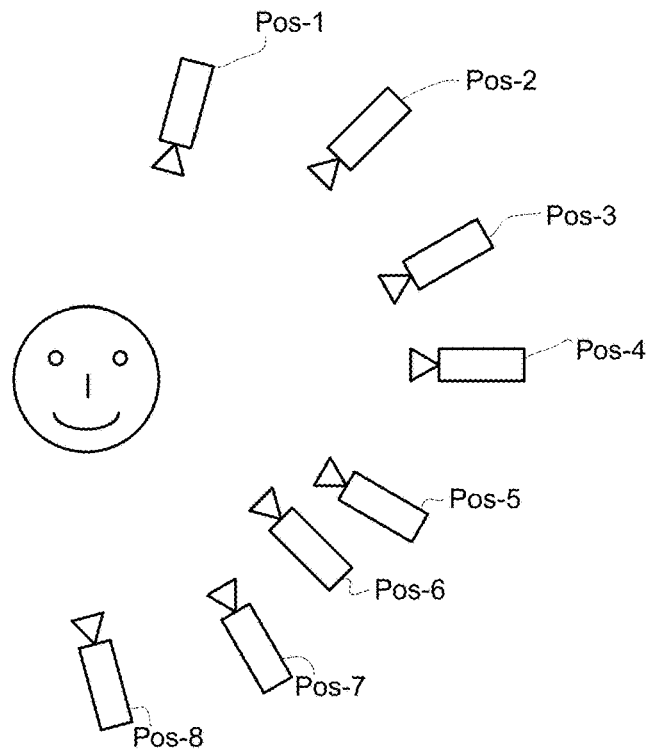
FIGS. 16D-16E illustrate examples of camera positions.

FIG. 16D illustrates a person and various cameras located at different positions (distances from the person and/or angle in relation to the person. The location of the face of the person within an image acquired by the camera at one position may differ from the location of the face of the person within an image acquired by the camera at another position. Angle may be pitch angle and/or roll angle and/or yaw angle.

Figure 16E:
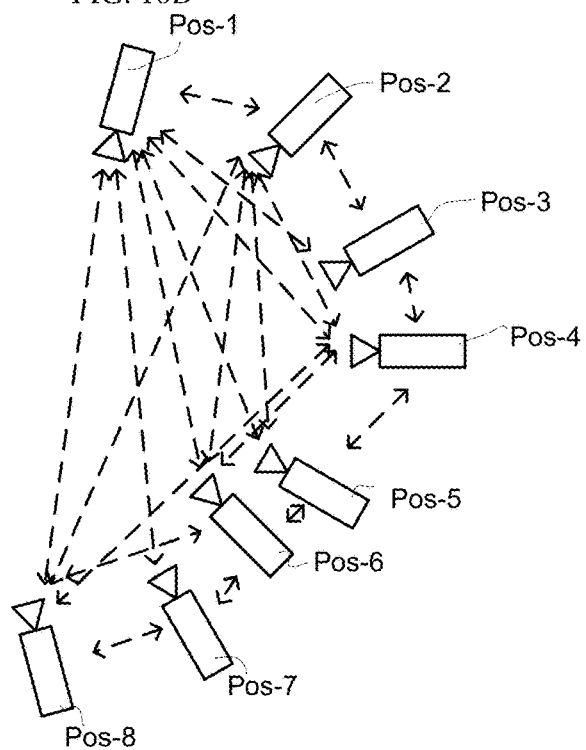

FIG. 16E illustrates relationships between the locations of the different cameras.

Figure 16F:
FIG. 16F illustrates an example of a method.

FIG. 16F illustrates some additional steps of the process 400 such as steps 460 and 470.

Step 460 may include finding out the translation and rotation matrices which describe the camera position. In order to reduce the amount of needed calculations to find the matrices, one can down-sample the number of landmarks used and utilize methods such as Random Sample Consensus (RANSAC) in order to accelerate the process. There is no need to do this between all the frames. It is enough to find these matrices for locations close to one another (this also means frames taken consecutively) and then finding these matrices relative to the first camera location.

This optimization process is relatively fast as the matrices are small in size (up to 4×4 elements). Once the camera pose (rotation and translation) of all the frames relative to the first frame is known, one can use known methods such as KinectFusion to provide a non-riggable model.

Step 470 may include creating a 3D mesh. The 3D mesh is not riggable as it has inaccuracies due to the fact that some vertices may have been defined when the face had different expressions or other reasons.

Figure 16G:
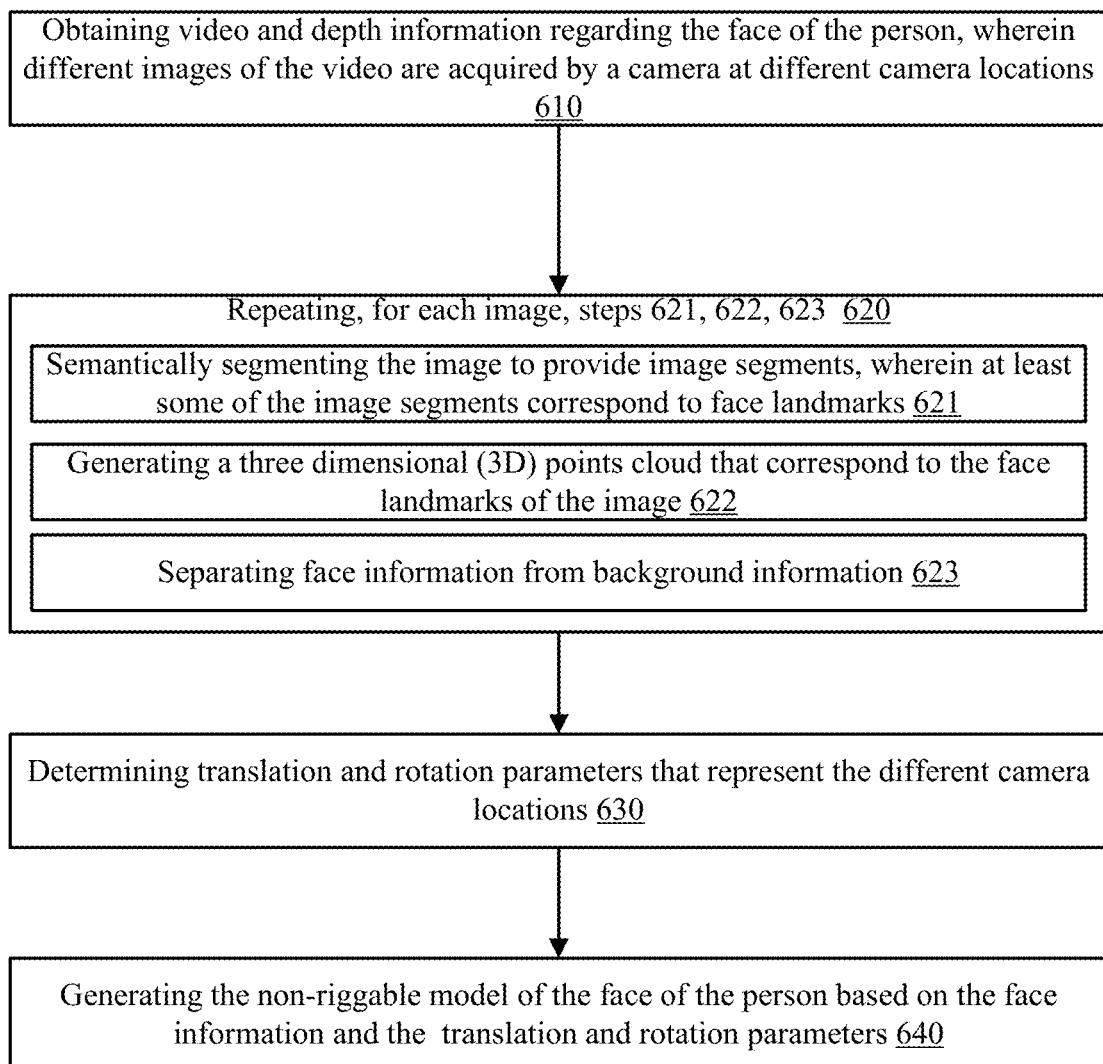
FIG. 16G illustrates an example of a method.

FIG. 16G illustrates an example of a method 600 for creating a non-riggable model of a face of a person.

Method 600 may start by step 610 of obtaining video and depth information regarding the face of the person, wherein different images of the video are acquired by a camera at different camera locations.

Step 620 may include repeating, for each image of the different images:
  a. Step 621 of semantically segmenting the image to provide image segments, wherein at least some of the image segments correspond to face landmarks.
  b. Step 622 of generating a three dimensional (3D) points cloud that correspond to the face landmarks of the image.
  c. Step 623 of separating face information from background information. This can be achieved by steps 621 and 622—or in any other manner.

Step 620 may be followed by step 630 of determining translation and rotation parameters that represent the different camera locations.

Step 630 may be followed by step 640 of generating the non-riggable model of the face of the person based on the face information and the translation and rotation parameters The determining of the translation and rotation parameters of step 630 may be (a) based on only a part of the different images, and/or (b) based on only a part of face landmarks of the different images and/or (c) based on face portions of different 3D points clouds obtained for the different images.

The determining of the translation and rotation parameters of step 630 may include applying a random sample consensus process.

The different camera locations may include multiple sets of camera locations, each set includes camera locations that are proximate to each other. Proximity may be up to a distance of few centimeters or more (can be predefined) and/or up to an angular range of a few angles of more (can be predefined) and/or a combination of both. The determining of the translation and rotation parameters may include calculating local translation and rotation parameters for each one of the sets of camera locations. What amounts to proximity may be dependent on the accuracy of the process and/or amount of available resources for executing method 600. For example—referring to FIG. 16E—locations 3-5 may be regarded as proximate to each other and locations 6-7 may be regarded as proximate to each other. When determining proximity—a clustering based process may be applied and proximate locations may be regarded as members of a cluster.

Step 610 may include determining shared-base translation and rotation parameters between a certain camera location and each one of the local translations and rotation parameters. The shared-base translation and rotation parameters means that the same coordinate system (of the certain camera location) is used to describe the each one of the local translations and rotation parameters. For example—referring to FIG. 16E—in relation to the n'th camera (N ranges between 1 and N)—the n'th camera shared-base translation and rotation parameters may represent the relative locations and rotations between the n'th camera and all other cameras.

A Method for Creating a Variable Model of a Person.

As mentioned above-Flame is an example of a component model used for recreating facial expressions, shape, pose and appearance. It does not represent a specific individual but rather a general head of a neutral non-specific person.

It has been found that the Flame model may be used to provide a variable model of a person.

There may be provided a method for creating a variable model of a person that may include applying an iterative process that finds the Flame parameters that would best match the vertices of a non-riggable model. The non-riggable model may be much smaller (include less than 30, 25, 20, 15, 10, 5 percent) than the Flame model. This process may be a gradual decent process. Once the iterative process converges and no additional adaptations are performed, a more accurate correction can be done to match all the adapted vertices to the non-riggable model. This may include finding 5000 offset values (between the values found when the iterative process converges). The offset values are sued to correct the model.

Once that is completed, the newly created model can then be used to recreate pose, expression, shape and appearance of a specific person and an avatar of the person can be realistically created.

Figure 17A:
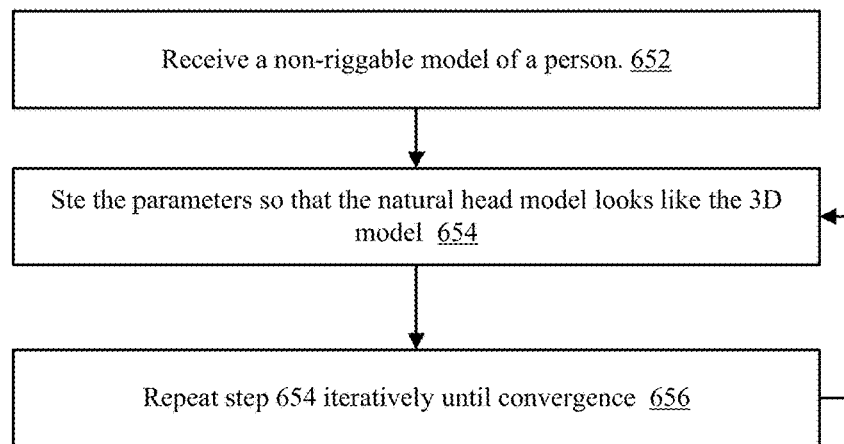
FIG. 17A illustrates an example of a method.

FIG. 17A illustrates an example of iterative process 650. The iterative process 650 includes:
  a. Step 652 of receiving a non-riggable model.
  b. Step 654 of setting the parameters of the Flame model so that the natural head model (obtained when applying the parameters to the Flame model) looks like the 3D model.
  c. Step 656 of repeating steps 652 and 654 until convergence.

Figure 17B:
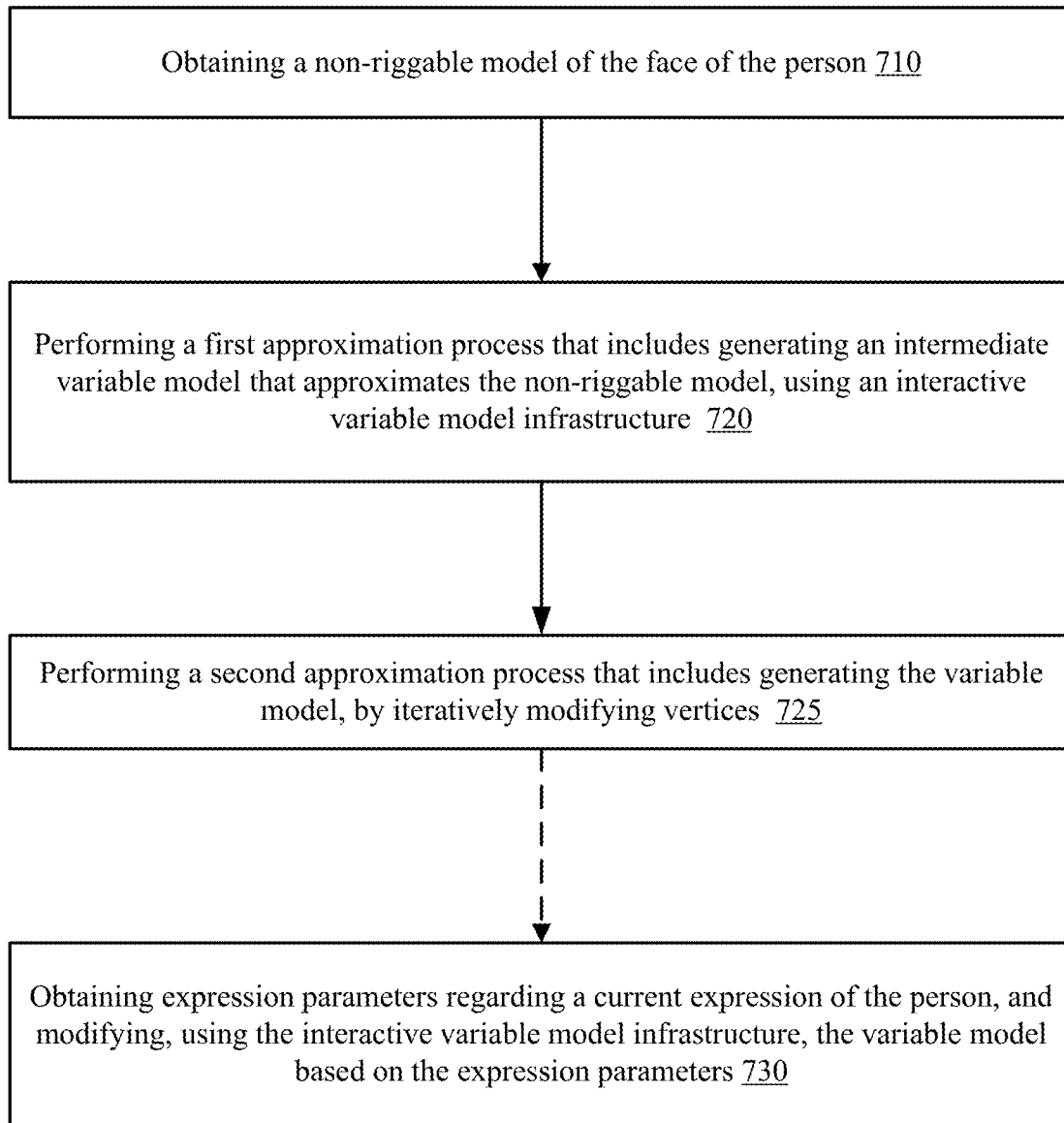
FIG. 17B illustrates an example of a method.

FIG. 17B illustrates an example of method 700 for creating a variable model of a face of a person Method 700 may start by step 710 of obtaining a non-riggable model of the face of the person.

The non-riggable model may lack an interactive variable model infrastructure.

Step 710 may be followed by step 720 of performing a first approximation process that includes generating an intermediate variable model that approximates the non-riggable model, using an interactive variable model infrastructure (such as the infrastructure of Flame). Step 720 may include iteratively changing shape parameters of the intermediate model until fulfilling a proximity condition.

Step 720 may be followed by step 725 of performing a second approximation process that includes generating the variable model, by iteratively modifying vertices.

The proximity condition may be a gradual descent proximity condition or any other condition.

The number of shape parameters is a fraction (for example less than 5, 10, 15, 20, 25, 30 percent) of a number of the vertices.

The variable model may be a Flame model or another variable model.

The number of the shape parameters may not exceed 100.

Method 700 may include step 730 of obtaining expression parameters regarding a current expression of the person, and modifying, using the interactive variable model infrastructure, the variable model based on the expression parameters.

Step 730 may include modifying the intermediate variable model by changing one or more expression parameters. The modifying may be executed while the shape parameters of the intermediate variable model may remain unchanged.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units, or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

We claim:

1. A method for creating a variable model of a face of a person, the method comprises:
   obtaining a non-riggable model of the face of the person;
   performing a first approximation process that comprises generating an intermediate variable model that approximates the non-riggable model, using an interactive variable model infrastructure; wherein the generating comprises iteratively changing shape parameters of the intermediate model until fulfilling a gradual descent proximity condition;
   obtaining expression parameters regarding a current expression of the person, and modifying, using the interactive variable model infrastructure, the variable model based on the expression parameters; and
   performing a second approximation process that comprises generating the variable model, by iteratively modifying vertices.

2. The method according to claim 1, wherein a number of shape parameters is a fraction of a number of the vertices.

3. The method according to claim 2, wherein the variable model is a Flame model.

4. The method according to claim 1, wherein a number of the shape parameters does not exceed 100.

5. The method according to claim 1, wherein the non-riggable model lacks an interactive variable model infrastructure.

6. A non-transitory computer readable medium for creating a variable model of a face of a person, the non-transitory computer readable medium stores instructions that once executed by a processor cause the processor to execute steps, the steps comprising:

obtaining a non-riggable model of the face of the person;

performing a first approximation process that comprises generating an intermediate variable model that approximates the non-riggable model, using an interactive variable model infrastructure; wherein the generating comprises iteratively changing shape parameters of the intermediate model until fulfilling a gradual descent proximity condition;

obtaining expression parameters regarding a current expression of the person, and modifying, using the interactive variable model infrastructure, the variable model based on the expression parameters; and performing a second approximation process that comprises generating the variable model, by iteratively modifying vertices.

7. The non-transitory computer readable medium according to claim 6, wherein a number of shape parameters is a fraction of a number of the vertices.

8. The non-transitory computer readable medium according to claim 7, wherein the variable model is a Flame model.

9. The non-transitory computer readable medium according to claim 6, wherein a number of the shape parameters does not exceed 100.

10. The non-transitory computer readable medium according to claim 6, wherein the non-riggable model lacks an interactive variable model infrastructure.

\* \* \* \* \*